United States Patent [19]

Nakazawa et al.

[11] Patent Number: 5,471,987
[45] Date of Patent: Dec. 5, 1995

[54] METHOD OF COMPRESSING A DYNAMIC RANGE FOR A RADIATION IMAGE

[75] Inventors: Masayuki Nakazawa; Hisanori Tsuchino, both of Hino, Japan

[73] Assignee: Konica Corporation, Tokyo, Japan

[21] Appl. No.: 215,261

[22] Filed: Mar. 21, 1994

[30] Foreign Application Priority Data

| Mar. 30, 1993 | [JP] | Japan | 5-072031 |
| Apr. 1, 1993 | [JP] | Japan | 5-075900 |
| Apr. 2, 1993 | [JP] | Japan | 5-076495 |

[51] Int. Cl.⁶ ............................................. G06F 159/00
[52] U.S. Cl. ............................................. 128/659
[58] Field of Search ................... 364/413.13, 413.14, 364/413.17, 413.18; 382/54, 6; 128/659

[56] References Cited

U.S. PATENT DOCUMENTS

| 4,387,428 | 6/1983 | Ishida et al. | 364/413.13 |
| 4,794,531 | 12/1988 | Morishita et al. | 364/413.13 |
| 4,903,205 | 2/1990 | Hishinuma | 364/413.13 |
| 4,918,534 | 4/1990 | Lam et al. | 348/367 |
| 5,012,333 | 4/1991 | Lee et al. | 358/520 |
| 5,319,719 | 6/1994 | Nakazawa et al. | 364/413.13 |

*Primary Examiner*—Donald E. McElheny, Jr.
*Attorney, Agent, or Firm*—Frishauf, Holtz, Goodman, Langer & Chick

[57] ABSTRACT

A dynamic range compression method for a radiation image for obtaining processed image signal carrying an image having a dynamic range that is narrower than that of the original image, by processing original image signal representing an original image based on radiation image information transmitted through an object. The method is for obtaining unsharp mask signal by averaging the original image signal in a predetermined mask area containing each pixel point corresponding to each pixel point and for correcting original image signal by providing a correction value that is a function of the unsharp mask signal to obtain a processed image signal. Weighting is applied corresponding to an absolute value of a signal different between a central pixel and a peripheral pixel both within a mask area in the averaging process for obtaining the unsharp mask signal.

61 Claims, 30 Drawing Sheets

REGION 3
PACEMAKER
REGION 2
REGION 4  REGION 1

ORIGINAL
IMAGE
SIGNAL Sorg

UNSHARP MASK
SIGNAL Sus

CORRECTION
VALUE f(Sus)

PROCESSED
IMAGE SIGNAL
Sproc

ORIGINAL IMAGE SIGNAL Sorg

UNSHARP MASK SIGNAL Sus

CORRECTION VALUE f(Sus)

PROCESSED IMAGE SIGNAL Sproc

METHOD OF COMPRESSING A DYNAMIC RANGE FOR A RADIATION IMAGE

BACKGROUND OF THE INVENTION

The present invention relates to a method of compressing a dynamic range for a radiation image. The invention particularly relates to a technology for improving a method of compressing a dynamic range for a radiation image, the method allowing to process an original image signal and to obtain an image signal carrying an image having a dynamic range narrower than that of the original image.

Heretofore, there has been known, for example, a technology such as that disclosed in Japanese Patent Publication Open to Public Inspection No. 222577/1991 (hereinafter referred to as Japanese Patent O.P.I. Publication) as a method for compressing a density region while keeping a fine structure in an image region to be suitable for observation, in a radiation image.

In a compression method disclosed in Japanese Patent O.P.I. Publication No. 222577/1991 mentioned above, unsharp mask signal (blurred signal) Sus corresponding to each pixel point is obtained by averaging original image signal Sorg in a predetermined mask region including the pixel point, and processed image signal Sproc wherein a dynamic range is compressed is obtained through an expression Sproc=Sorg+f(Sus)

when f(Sus) represents a function that monotonically decreases as the unsharp mask signal Sus increases.

Inventors of the present invention found that it is preferable to make the mask size for the unsharp mask signal Sus large when obtaining sufficient effects of compression while keeping a fine structure to be suitable for observation, in the above-mentioned method of compressing a dynamic range wherein unsharp mask signal Sus is used.

On the other hand, the present inventors found simultaneously the problem that when a mask size is large, the sharp cut of an edge of an unsharp image is deteriorated at a portion where signal values change sharply, and thereby unwelcome compression is carried out in the vicinity of a border between an region requiring compression and that requiring no compression. For example, there has been a problem that unwelcome compression is carried out in the vicinity of a border between a directly exposed region representing a high density region and an object region because of a big difference of signals between them, resulting in an occurrence of an artifact (a fabricated image).

In the case of simultaneous compression for both the low-density region and high-density region, when compression is carried out for the both density region based on the same compression rate, there has been a problem that the compression rate established to be suitable for the region of one side is hoe necessarily the best for the region of the other side.

In the dynamic range compression such as that mentioned above, it is an object to obtain the contrast characteristics which are optimum for image reading on the targeted region in the visualized state such a hard copy obtained finally. In the conventional dynamic range compression method, however, the following problems have been caused because of a determination of a degree of correction made based on inputted digital image signals (original image signals).

Namely, even when a certain correction function (for example, a linear function) is established for an inputted digital signal value, a correction degree of dynamic range compression is sometimes changed (the linear function disappears) when visualized finally, depending on gradation characteristics of a recording material or the like used for obtaining a hard copy, thus it has been impossible to provide stably the dynamic range compression processing that is optimum on the final state of indication (on a hard copy).

Furthermore, in the conventional dynamic range compression method wherein a dynamic range is compressed at a constant compression rate regardless of the dynamic range of an object, there has been a possibility of occurrence of a problem that excessive compression is caused in compression processing for a low-density area in a chest image of a person who is thinner than an average person, for example, and thereby density on a mediastinum region increases to lower the diagnostic power, while in the case of a fat person on the contrary, insufficient compression is caused and thereby density decreases to be white on the mediastinum portion.

Incidentally, when there is a big difference between signals in an image, the difference of signal values mentioned above is sometimes required to be kept as it is.

However, in the conventional dynamic range compression method wherein large increase correction is made when an unsharp mask signal is small, while, large decrease correction is made when an unsharp mask signal is large, there has been a problem that when compressing a high-density region, for example, the signal value in a directly exposed region which does not need to be corrected is lowered than is required, or the signal value which is extremely low in the non-irradiation region is forced to be raised in compression of a low-density region.

Further, when a portion where signal values are extremely different exists in an region that does not need compression, that portion can not be exempted from compression processing, which is a problem. For example, in compression processing of a low-density region in an image of a front view of a chest, when there is a metal such as a pacemaker or the like in a lung regions (a high-density region), there is caused a problem that the portion of the pacemaker shows a small signal value and thereby unwelcome compression is carried out when a correction value is established with a function of the signal value, resulting in approach between a signal level of the pacemaker and that of the lung regions, by which a difference of signal values can not be kept.

In the conventional compression method mentioned above, there has also been a problem that sufficient effects of dynamic range compression can not be obtained depending on a region because the frequency characteristic for obtaining an unsharp mask signal is constant.

Namely, frequency components contained in an image vary depending on a radiographing region, and there is also an individual difference even for the same region. Therefore, in the case of correction made with the unsharp mask signal obtained under the conditions of a mask type (a mask shape and a type of operation for unsharpening) and a mask size which are always constant, it has sometimes happened that sufficient effects of dynamic range compression can not be obtained depending on an object.

Further, even in the case of the same image, frequency components contained in the image vary depending on the region in the image. Therefore, the mask type and mask size which are constant sometimes prove to be improper.

SUMMARY OF THE INVENTION

The first object of the invention is to achieve, in a dynamic range compression method employing an unsharp mask signal, that the unsharp mask signal can be established properly and compression characteristics can be made appropriate for each density region, recording material and object.

The second object of the invention is to provide a dynamic range compression method wherein more compression correction than needed by a directly exposed region and a non-irradiation region can be avoided, and even when an region where no compression is required includes a portion having an extremely large or small signal value, it can be avoided that compression processing is forced to be carried out being affected by the portion having such an extreme difference of signals.

The third object of the invention is to provide a dynamic range compression method wherein an artifact is not caused even on an region where original image signals vary sharply.

The object is to provide further a dynamic range compression method wherein stable dynamic range compression effects can be obtained without being affected by a radiographing region and an individual difference.

An embodiment of a dynamic range compression method for a radiation image related to the invention for achieving the aforementioned objects of the invention is represented by a dynamic range compression method which is a method for obtaining processed image signal Sproc carrying an image having a dynamic range that is narrower than that of the aforementioned original image, by processing original image signal Sorg representing an original image based on radiation image information transmitted through an object, and which is for obtaining unsharp mask signal Sus corresponding to each pixel point by averaging the original image signal Sorg in a predetermined mask region containing the pixel point and for correcting original image signal Sorg by correction value f1 Sus) that is a function of the unsharp mask signal Sus to obtain the processed image signal Sproc, wherein weighting is applied corresponding to the absolute value of the signal difference between a central pixel and a peripheral pixel both within a mask region in the averaging process for obtaining the unsharp mask signal Sus.

In this case, it is preferable that the signal value of the peripheral pixel having a larger absolute value of signal difference from the central pixel is subjected to less weighting in the averaging process mentioned above.

Further, in the averaging process mentioned above, there is given weighting corresponding to the positional relation between the central pixel and the peripheral pixel in the mask region.

In this case, it is preferable that less weighting is given to the signal value of the peripheral pixel having the greater distance from the central pixel.

Further, in the dynamic range compression method wherein processed image signal Sproc whose dynamic range is compressed is obtained by correcting with correction value f1 (Sus) corresponding to unsharp mask signal Sus as stated above, correction by simple means of the aforesaid correction value f1 (Sus) is caused to be made at each of high-density region and low-density region of original image signal Sorg at different compression rate.

Further, in the constitution for outputting processed image signal Sproc to a display unit after image processing for obtaining processed image signal Sproc whose dynamic range is compressed, the above-mentioned processed image signal Sproc is obtained, while obtaining unsharp mask signal Sus corresponding to each pixel point, so that the following relation may be satisfied, Dproc=Dorg+f2 (Dus)

when Dorg represents displayed density on the aforesaid display unit corresponding to the above-mentioned original image signal Sorg, Dproc represents display density on the display unit corresponding to the processed image signal Sproc, Dus represents display density on the display unit corresponding to the unsharp mask signal Sus, and f2 (Dus) represents a density correction value that is a function of the display density Dus.

In the dynamic range compression method for a radiation image for obtaining processed image signal Sproc by correcting original image signal Sorg with correction value f1 (Sus) based on unsharp mask signal Sus, the absolute value of a rate of a change of the correction value f1 (Sus) to a change of the unsharp mask signal Sus increases gradually as unsharp mask signal Sus decreases for correction value f1 (Sus) that increases original image signal Sorg for correction, while it increases gradually as unsharp mask signal Sus increases for correction value f1 (Sus) that decreases original image signal Sorg for correction.

In the dynamic range compression method for a radiation image for obtaining processed image signal Sproc carrying an image whose dynamic range is narrower than that of the original image by processing original image signal Sorg, at least one of a dynamic range compression method and a compression rate is caused to change corresponding to information of the aforementioned object.

In this case, it is preferable that information of the object mentioned above includes at least one of dynamic range information of the object and information of a radiographing region of the object.

With regard to compression processing for a dynamic range, it is possible to employ a constitution wherein unsharp mask signal Sus is obtained corresponding to each pixel point and original image signal Sorg is corrected with correction value f1 (Sus) that is a function of the unsharp mask signal Sus, and thereby the processed image signal Sproc is obtained.

When changing a compression rate of the dynamic range mentioned above, it is preferable that the compression rate is increased as a dynamic range of an object increases.

It is also possible to employ the constitution wherein a compression rate of the dynamic range mentioned above is changed so that the dynamic range of the processed image signal Sproc may almost agree with the reference dynamic range.

It is further preferable to employ the constitution wherein the maximum value of the compression degree of the dynamic range is established, and setting of the compression degree exceeding the maximum value is prohibited.

In the constitution mentioned above, when obtaining unsharp mask signal Sus, there is provided weighting corresponding to the absolute value of a signal difference for the central pixel in a mask region or to a positional relation between the central pixel and a peripheral pixel. Therefore, even when signals change sharply in the mask region, it is possible to avoid that setting of unsharp mask signal Sus is affected greatly by the sudden change of the signal. Therefore, when less weighting is provided for the greater absolute value of the signal difference from the central pixel, or for the greater distance from the central pixel, even when there is a high-density portion or a low-density portion having an extremely large signal difference on an edge of the mask region, it is possible to minimize an influence of the portion having a large signal difference on a simple mean value.

When both the high-density region and low-density region of original image signal Sorg are subjected simultaneously to compression processing, employment of different compression rate for each region has made it possible to provide appropriate compression processing for each density region.

Further, in the constitution wherein processed image signal Sproc which has been subjected to dynamic range compression processing is outputted to a display unit, dynamic range compression required on a display density basis is established so that desired dynamic range compression may be conducted on display density on the display unit, and thereby processed image signal Sproc in accordance with such requirement can be obtained.

With regard to gradation characteristics on the aforementioned display unit, the lower density region as well as the higher density region show a lower contrast generally, and correction characteristics matching the gradation characteristics mentioned above are desired accordingly. For that reason, correction value f1 (Sus) is changed for the of unsharp mask signal Sus at the change rate which increases as a location moves to the low-density region or to the high-density region, without being changed at a constant rate.

Further, a compression method and a compression rate for a dynamic range are changed in accordance with information of an object to avoid that the compression rate is excessive or insufficient depending on the difference between objects. To be concrete, a compression rate is increased in accordance with an increase of a dynamic range of an object, and the compression rate is changed so that the dynamic range of image signals after processing may agree with a reference dynamic range.

In this case, setting of the compression rate exceeding the predetermined maximum value is prohibited for the purpose of preventing the setting of an excessive compression rate.

Further, in other embodiment of a dynamic range compression method for a radiation image related to the invention, original image signals Sorg representing an original image based on radiation image information transmitted through an object are processed and thereby processed image signals Sproc carrying an image whose dynamic range is narrower than that of the original image are obtained, and the embodiment is represented by a dynamic range compression method for a radiation image for obtaining the aforementioned processed image signals Sproc by computing ps Sproc=Sorg+f1 (Sus)

in which Sus represents unsharp mask signals obtained corresponding to each pixel point and f1 (Sus) that is a function of the unsharp mask signals Sus represents a correction value, wherein the correction value f1 (Sus) mentioned above takes the positive maximum value at the point where the unsharp mask signal Sus shows a predetermined median value Sus A, and it decreases monotonically as the unsharp mask signal Sus increases in the region where the unsharp mask signal Sus exceeds the predetermined median value Sus A, while, it is fixed to the aforementioned positive maximum value or decreases monotonically as the unsharp mask signal Sus decreases in the region where the unsharp mask signal Sus is lower than the predetermined median value Sus A.

Further, in the embodiment mentioned above, the aforesaid correction value f1 (Sus) takes the negative minimum value at the point where the unsharp mask signal Sus shows a predetermined median value Sus B, and it decreases monotonically as the unsharp mask signal Sus increases in the region where the unsharp mask signal Sus is lower than the predetermined median value Sus B, while, it is fixed to the aforementioned negative minimum value or increases monotonically as the unsharp mask signal Sus increases in the region where the unsharp mask signal Sus exceeds the predetermined median value Sus B.

In this case, it is also acceptable that when the aforesaid two function characteristics are combined and two different median values for the unsharp mask signal Sus are represented respectively by Sus A and Sus B (Sus A<Sus B), the correction value f1 (Sus) mentioned above takes the positive maximum value at the point of the aforesaid median value Sus A while it takes the negative minimum value at the point of the aforesaid median value Sus B, and it decreases monotonically as unsharp mask signal Sus increases in the signal region interposed between the aforesaid two median values Sus A and Sus B, it is fixed to the aforesaid positive maximum value or it decreases monotonically as unsharp mask signal Sus decreases in the region where the unsharp mask signal Sus is lower than the median value Sus A, and it is fixed to the negative minimum value or it increases monotonically as unsharp mask signal Sus increases in the region where the unsharp mask signal Sus exceeds the aforesaid median value Sus B.

On the other hand, in a dynamic range compression method for a radiation image for obtaining processed image signal Sproc carrying an image whose dynamic range is narrower than that of the aforesaid original image by processing original image signal Sorg representing an original image based on radiation image information transmitted through an object, wherein, when a correction function is represented by F, image signals Sproc for compressed dynamic range are obtained by computing Sproc=Sorg+F a plurality of functions which differ each other are provided in advance as the aforesaid correction function F, and different correction function F is determined for each of plural regions in an image.

In this case, it is preferable that the plural regions in the image mentioned above are divided by at least one of those including contours of the aforesaid object, contours of internal structures of the object and border lines of non-irradiation regions.

It is also preferable that the plural correction functions F mentioned above contain function f1 (Sus) that decreases monotonically as unsharp mask signal Sus corresponding to each pixel point increases and function f2 that is independent of the unsharp mask signal Sus.

Owing to the structural arrangement mentioned above, it is possible to prevent excessive compression on the portion where a signal value is low because there is no increase of an increasing correction amount caused by correction value f1 (Sus) in the region where the correction value is lower than the median value Sus A.

In the same way, it is possible to prevent excessive compression on the portion where a signal value is high because there is no increase of a decreasing correction amount caused by correction value f1 (Sus) in the region where the correction value exceeds the median value Sus B.

Furthermore, it is possible to conduct compression while preventing excessive compression on both an region of a high signal value and an region of a low signal value, by establishing concurrently the variation characteristics for correction values whose border lines are represented by the median values Sus A and Sus B, as stated above.

It is further possible to avoid undesirable correction by dividing an region with contours of an object, contours of internal structures of the object or by border lines of non-irradiation regions and by determining a different function for each region for compression without compressing a dynamic range by only one correction function in the same image.

Especially, in the case of the arrangement wherein a correction value is established by using unsharp mask signal Sus on each pixel point as a dynamic range compression method, when there is a foreign matter offering extremely different signal values, establishment of a correction value based on signal values is affected by the aforesaid foreign matter. Therefore, there has been made an arrangement wherein a correction value employing no unsharp mask signal Sus can be used properly for each image region.

Further, in the invention, at least one of those including a type of an unsharp mask and a mask size both for obtaining the aforesaid unsharp mask signal Sus can be changed depending on information of an object.

In this case, it is preferable that the aforesaid information of an object include at least one of information of frequency component of object information and information of radiographing region on the object.

Further, in the dynamic range compression method related to the invention, at least one of those including a type of an unsharp mask and a mask size both for obtaining the aforesaid unsharp mask signal Sus can be changed for each of the aforesaid plural regions depending on information of frequency components of plural regions in the same image.

Owing to the structural arrangement mentioned above, at least one of those including a type of an unsharp mask and a mask size both for obtaining unsharp mask signal Sus is changed depending on information of an object, and thereby it is possible to conduct proper dynamic range compression processing for each image without being affected by the difference between radiographing regions and an individual difference of an object.

By including, as the aforementioned object information, at least one of frequency component information of object signals and information of radiographing region in an object, it is possible to conduct dynamic range compressing matching frequency characteristics of each image.

Further, when at least one of a type of an unsharp mask and a mask size is changed for plural regions in the same image, it is possible to deal with a difference of a frequency characteristic of each region in the same image.

By correcting original image signals Sorg by the correction value f (Sus) that is a function of unsharp mask signal Sus representing a median value of signal values on pixels within a mask region, it is possible to obtain processed image signal Sproc with a compressed dynamic range.

By using a median value as unsharp mask signal Sus as stated above, it is possible to obtain a sharp edge on a portion where signals change sharply, and to inhibit occurrence of an artifact, compared with an occasion wherein unsharp mask signal Sus is represented by a simple mean value of signal values of pixels in a mask region, for example.

In particular, in the case of dynamic range compression of a radiation image having therein a directly exposed region where radiation is exposed without being transmitted through an object, it is possible to inhibit occurrence of an artifact in a portion where signals on a border between an object region and a directly exposed region change sharply, by applying on a high density signal region the dynamic range compression wherein unsharp mask signal Sus is represented by the aforementioned median value.

DETAILED DESCRIPTION OF THE PREFERRED EMBODIMENTS

Examples of the invention will be explained as follows.

Figure 1:
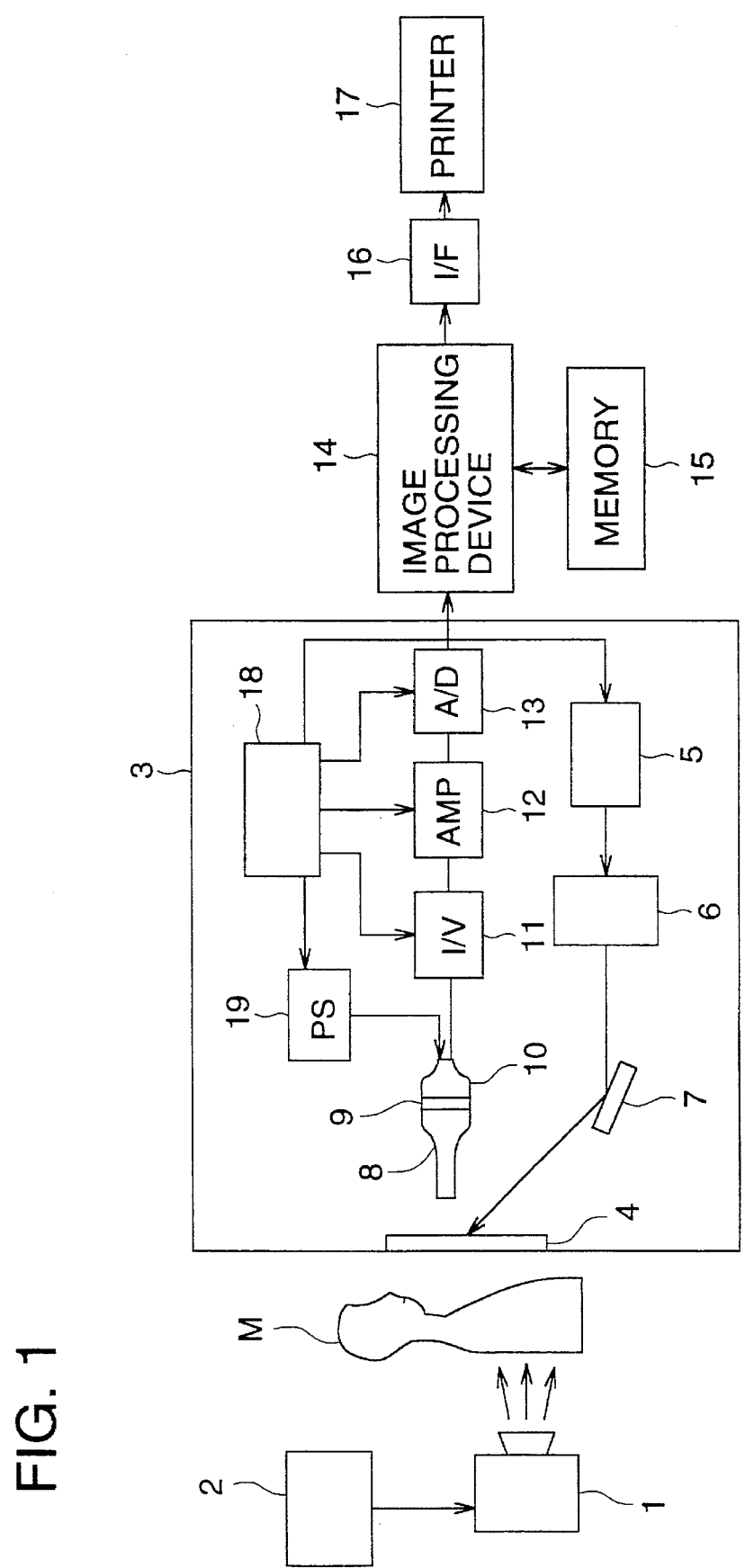
FIG. 1 is a block diagram showing a radiation image reading and processing apparatus to which the invention is applied.

FIG. 1 shows an example wherein a human body is radiographed by a radiation image reading apparatus containing an image processing device to which a dynamic range compression method for a radiation image related to the invention is applied.

In the example, radiation generator 1 is controlled by radiation control unit 2 and irradiates radiation (generally, X-rays) toward an object (chest of a human body and others) M. Record reading apparatus 3 is provided, on its side facing the radiation generator 1 through object M, with conversion panel 4. In the conversion panel 4, energy distributed in accordance with distribution of radiation transmissivity of the object M to amount of radiation irradiated from the radiation generator 1 are accumulated in a stimulative fluorescent layer and thereby a latent image of the object M is formed on the conversion panel.

On a support constituting the conversion panel 4 mentioned above, a stimulative fluorescent layer is formed through a method of vapor-phase accumulation of a stimulable phosphor or through a method of coating stimulable phosphor coating, and the stimulative fluorescent layer is shielded or covered with a protecting member to be shielded against an adverse effect of environment and damage. As a material for the stimulable phosphor, those disclosed in Japanese Patent O.P.I. Publication Nos. 72091/1986 and 75200/1984 are used.

Light beam generator (gas laser, solid laser, semiconductor laser and others) 5 generates a light beam whose emitted intensity is controlled, and the light beam passes through various optical systems and then arrives at scanning device 6 where the beam is subjected to polarization. An optical path of the light beam is further deflected by mirror 7 so that the light beam can be led to the conversion panel 4 as scanned stimulating beam.

Light-converging member 8 is positioned so that its light-converging end is adjacent to the conversion panel 4 where accelerating/exciting light scans, and it receives stimulated emission whose emission intensity is proportional to latent image energy form conversion panel 4 that is scanned by the aforementioned light beam. The numeral 9 is a filter that transmits only light in an region of wavelength of stimulated emission, and light transmitted through the filter 9 enters photomultiplier tube 10 and is converted photoelectrically to current signals corresponding to that light of incidence.

An electric current outputted from the photomultiplier 10 is converted into voltage signals by current/voltage converter 11, amplified by amplifier 12 and then converted by A/D converter 13 into radiation image signals composed of digital data of each pixel.

The digital radiation image signals (original image signals Sorg) are outputted successively to image processing device 14 having therein a built-in microcomputer.

The numeral 15 is an image memory (magnetic disk device) wherein image signals are stored. The numeral 16 is an interface for transmitting radiation image signals directly from the image processing device 14 to printer 17 or transmitting radiation image signals read from the image memory 15 to printer 17. The numeral 18 is a reading gain adjusting circuit, and adjustment of intensity of light from light beam generator 5, gain adjustment for photomultiplier 10 by simple means of adjustment of power voltage of high voltage power supply 19 for a multiplier, gain adjustment for current/voltage converter 11 and amplifier 12, and adjustment of input dynamic range of A/D converter 13 are all carried out by the reading gain adjusting circuit 18, thus, reading gain for radiation image signals can be adjusted collectively.

Incidentally, a method for acquiring original radiation image signals Sorg to be outputted to the aforementioned image processing device 14 is not limited to a method for acquiring by converting photoelectrically stimulated emission obtained by scanning stimulable phosphor with stimulating beam, but it may also be a method for reading an image on an X-ray film through photoelectrical conversion, or a method wherein a phosphor is irradiated by radial rays transmitted through an object are projected on a phosphor to be converted into fluorescence which is converted photoelectrically and is read.

Original radiation image signals Sorg may either be in a form to be proportional to intensity of detected radiation or be in a form to be proportional to a logarithm of intensity of detected radiation, and the latter is more preferable.

The image processing device 14 is provided with an image processing function for compressing a dynamic range of original image signal Sorg to be inputted and thereby for obtaining processed image signal Sproc carrying an image whose dynamic range is narrower than that of an original image. Image processing for the above dynamic compression is carried out through the following expression.

$$Sproc = Sorg + f1\ (Sus)$$

In the above expression, Sus represents unsharp mask signals obtained by averaging original image signals Sorg in a predetermined mask including each pixel point corresponding to each pixel point.

On the other hand, f1 (Sus) to be added to the original image signals Sorg is a correction value obtained as a function of unsharp mask signal Sus, and it decreases monotonically as unsharp mask signal Sus increases. Incidentally, "monotonical decrease" is defined as follows: f1 (Sus) does not necessarily need to decrease as unsharp mask signal Sus increases, and an region where f1 Sus does not change despite the change of Sus may exist partially.

Figure 2:
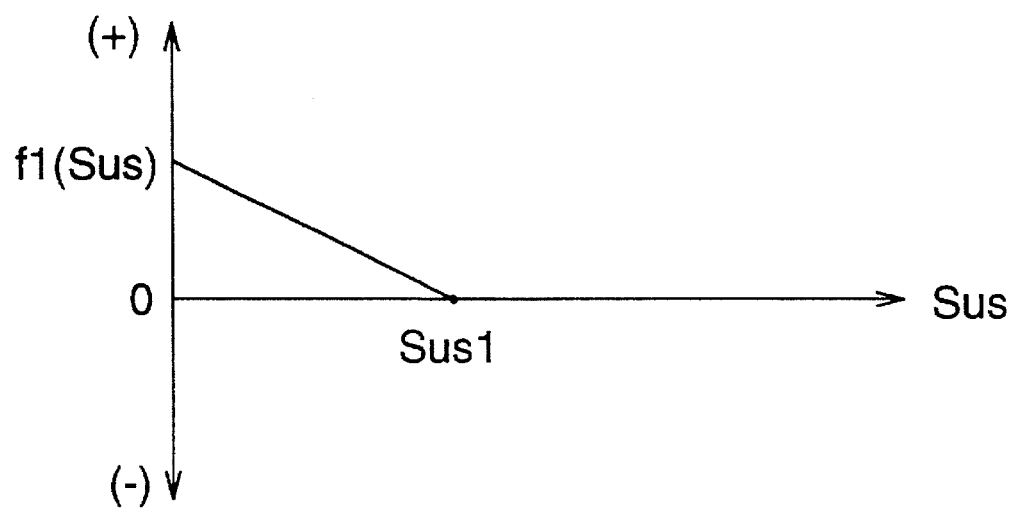
FIG. 2 is a diagram showing an example of a function form for a correction value corresponding to unsharp mask signals.

FIG. 2 is a diagram showing an example of the aforementioned correction value f1 (Sus), wherein the correction value f1 (Sus) shows characteristics that it is zero in an region where the value of Sus is greater than Sus 1, while it increases at a constant rate toward the plus side as the unsharp mask signal Sus decreases. These characteristics are shown by the following expressions.

$$f1\ (Sus) = \beta\ (Sus\ 1 - Sus) \quad (Sus < Sus\ 1)$$
$$= 0 \quad (Sus \geq Sus\ 1)$$

Since an increase of image signal Sorg results in an increase of density in the present example, when the aforesaid correction value f1 (Sus) is added to original image signal Sorg, the low density region is lifted up and compressed.

Owing to the constitution mentioned above, a dynamic range of an region with low average density is compressed by unsharp mask signal Sus. It is therefore possible to obtain an image wherein the contrast of a microscopic structure thereof remains unchanged and a low density portion thereof is compressed.

Incidentally, in the constitution of the present example, when obtaining unsharp mask signal Sus of each pixel point through processing for averaging signal values of images included in a predetermined mask region, there is conducted weighting corresponding to the absolute value of a difference of signals between a central pixel and a peripheral pixel both within the mask region, and the weighting for the signal value of the peripheral pixel having the greater absolute value of the difference of signals from the central pixel is made smaller.

Concretely, unsharp mask signal Sus (x, y) corresponding to each pixel point is calculated in accordance with the following expression (1). Incidentally, (x, y) represents a coordinate position of a pixel, while Sorg (x, y) represents a central pixel in the mask region.

Expression 1

$$Sus(x,y) = \Sigma_i \Sigma_j Sorg(x-i, y-j) \cdot K(\Delta S)$$

Figure 3:
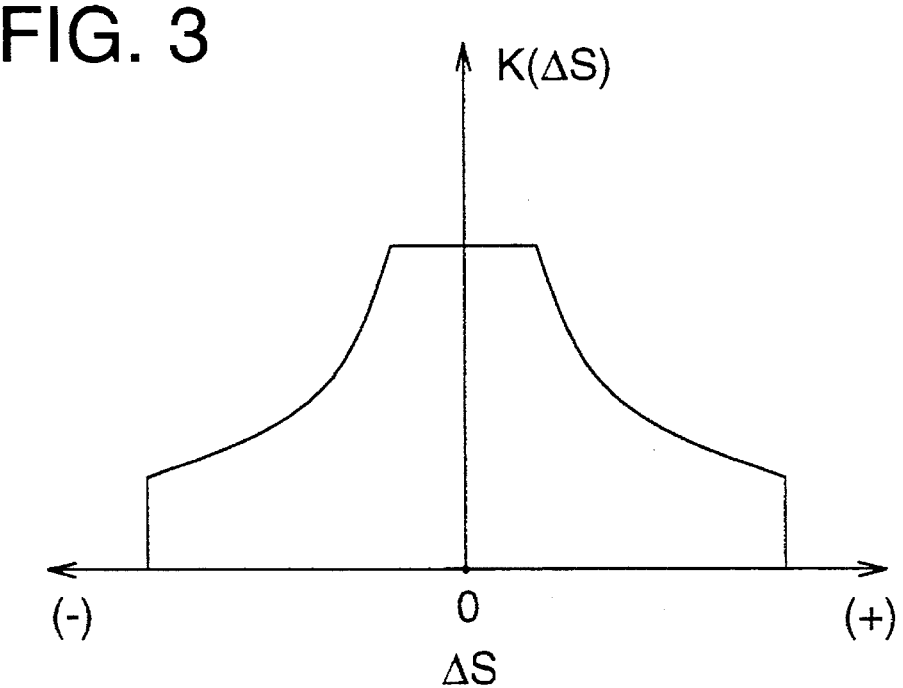
FIG. 3 is a diagram showing weighting characteristics corresponding to a difference of signals in a mask region.

In the expression mentioned above, $\Delta S$ is represented by $\Delta S = Sorg\ (x, y) - Sorg\ (x-i, y-j)$, and it shows a deviation between signal value Sorg (x, y) of a central pixel (x, y) and signal value Sorg (x-i, y-j) of a peripheral pixel (x-i, y-j) both in the mask region. The K ($\Delta S$) described above represents a function corresponding to the aforementioned deviation $\Delta S$ and the function form thereof is established as shown in FIG. 3.

Namely, when the absolute value of the aforementioned deviation $\Delta S$ is smaller, the greater weighting is given to the peripheral pixel for averaging processing, while, when the absolute value of the aforementioned deviation $\Delta S$ is larger on the contrary, less weighting is given to the peripheral pixel, so that the peripheral pixel having the large deviation against the central pixel may not affect greatly on computing of an average value.

When unsharp mask signal Sus is computed as shown above, even when a pixel having an extremely different signal level exists in the peripheral portion in the mask region, it is possible to deter that an average value is shifted being affected by the peripheral pixel. It is therefore possible to prevent that an average value is shifted being affected by the sharp change of signals in the mask region and thereby the region which is preferred not to be compressed from the beginning is forced to be compressed. Thus, occurrence of an artifact can be prevented.

Though weighting for the averaging processing is conducted corresponding to the absolute value of a signal difference from the central pixel in the example mentioned above, the same effect can also be obtained through the method wherein less weighting is given to the peripheral pixel having the longer distance from the central pixel.

In this case, the following expressions (2) and (3) are actually used for computing unsharp mask signal Sus (x, y).

Expression (2)

$$Sus(x,y) = \Sigma_i \Sigma_j Sorg(x-i, Y-j) \cdot G(x-i, y-j)$$

Expression (3)

$$G(x-i, y-j) = a/[\{(x-i)^2 + (y-j)^2\}^{1/2} + b]$$

Figure 4:
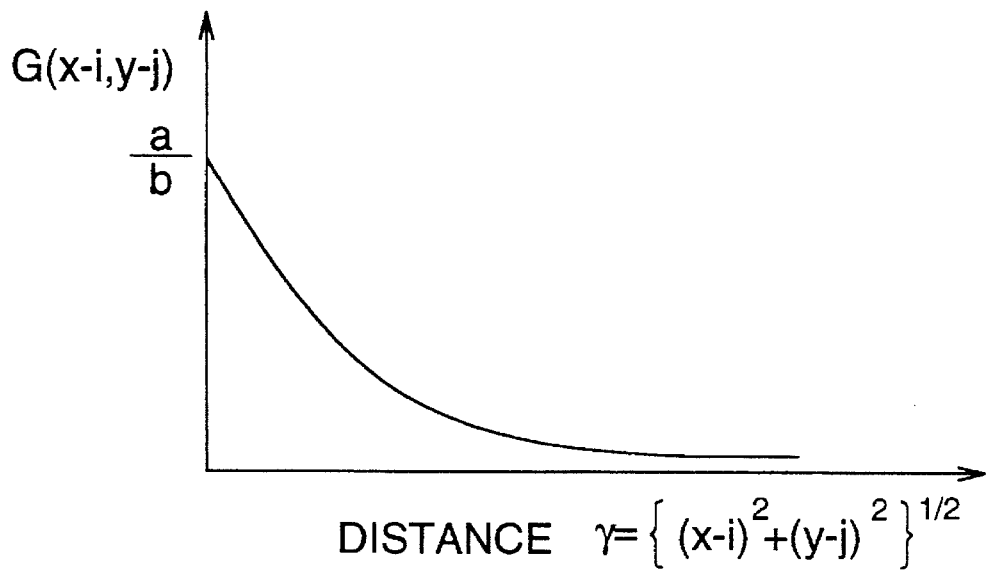
FIG. 4 is a diagram showing weighting characteristics corresponding to a distance in a mask region.

In the expression described above, function G (x-i, y-j) is a function of a distance between a target pixel and a central pixel (x, y), and it is a weighting coefficient that gives smaller weighting to the peripheral pixel when its distance $\tau$ is larger as shown in FIG. 4 under the following assumption.

$$\text{distance } \tau = \{(x-i)^2 + (y-j)^2\}^{1/2}$$

When smaller weighting is given to the peripheral pixel that is farther away from the central pixel as described above, even when there is a portion having extremely different signal values in the peripheral region within the mask region, such peripheral region does not affect, and despite the sudden change of signal values in the mask region, an average value is computed to be a value close to the central pixel, thus, desired compression processing can be carried out.

Incidentally, it is also possible to combine the weighting corresponding to the absolute value of the difference of signals from the central pixel and the weighting corresponding to the distance to the central pixel.

Although only the low density region is compressed based on correction value f1 (Sus) with characteristics shown in FIG. 2 in the above example, it is also possible to compress the high density region by establishing the negative correction value f1 (Sus) which corrects by decreasing signal values of the high density region.

It is further possible to carry out the weighting for the low density region and that for the high density region simultaneously. In this case, however, the rate of weighting for the low density region and that for the high density region are not the same in many cases. Therefore, it is preferable to establish different rates of compression for the low density region and the high density region so that optimum dynamic range compression may be carried out for each of them.

Figure 5:
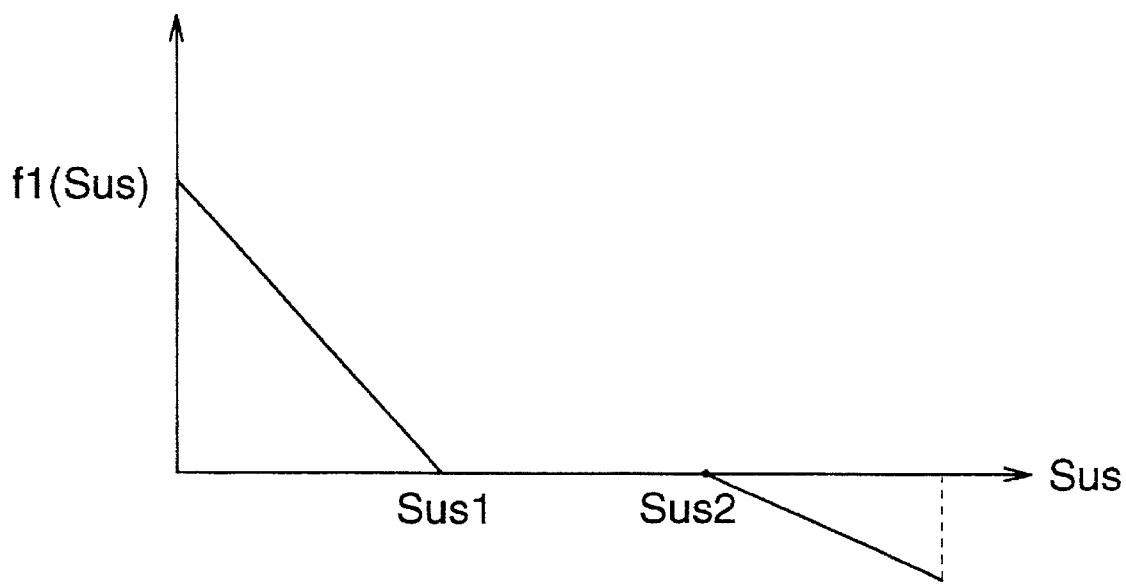
FIG. 5 is a diagram showing examples of characteristics of correction values for compression conducted at high density region and low density region.

FIG. 5 shows examples of characteristics of correction value f1 (Sus) adapted to a front view image of the head, and characteristics of the correction value f1 (Sus) shown in FIG. 5 are represented by the following expressions;

$$
\begin{aligned}
f1\ (Sus) &= \beta_1\ (Sus\ 1 - Sus) & (Sus \leq Sus\ 1) \\
&= 0 & (Sus\ 1 < Sus \leq Sus\ 2) \\
&= \beta_2\ (Sus\ 2 - Sus) & (Sus > Sus\ 2)
\end{aligned}
$$

wherein, coefficient $\beta$ determining the compression rate is represented by $\beta_1=0.6$ and $\beta_2=0.4$.

Further, Sus 1 and Sus 2 each determining a compression density region were calculated as follows by changing weighted simple mean k of maximum signal value Smax and minimum signal value Smin when the maximum signal value and the minimum signal value of the region of interest in the image are represented respectively by Smax and Smin.

Sus 1=k·Smax+(1−k) Smin (k=0.5)

Sus 2=k·Smax+(1−k) Smin (k=0.9)

In the constitution wherein each of the high density region and the low density region is compressed based on the different compression rate, both the high density region and the low density region can be subjected to optimum compression simultaneously without any problem that a density region on one side can be subjected to optimum compression but a density region on the other side can not, just like the occasion where a constant gradient (coefficient $\beta$) is given. In particular, it is preferable that the compression rate for the high density region is smaller than that for the low density region for radiation images for medical use.

Figure 6:
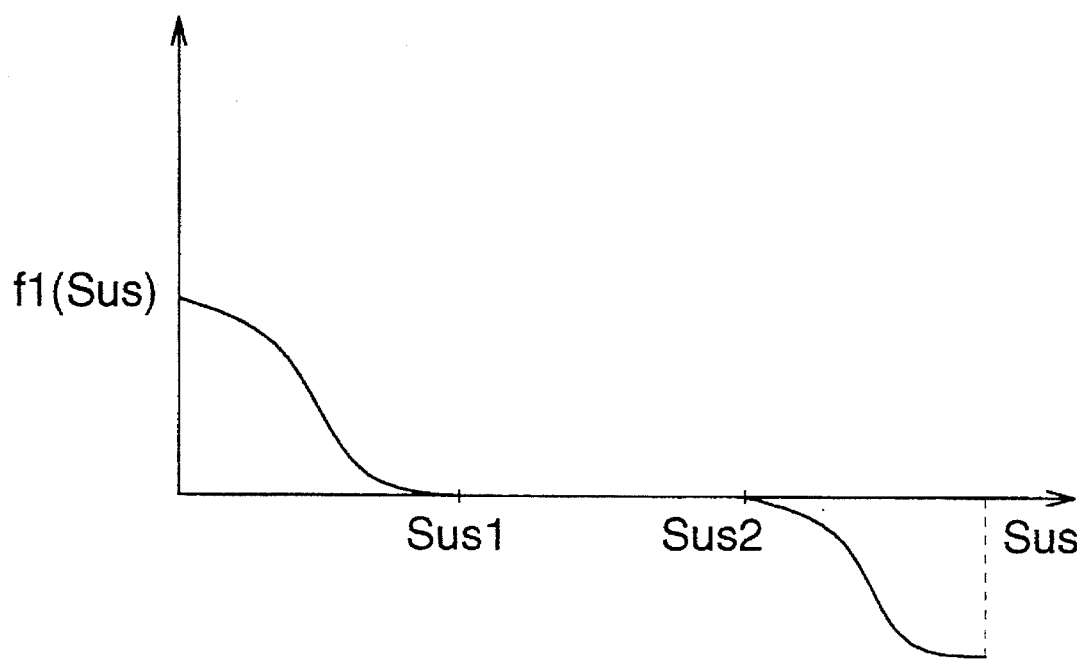
FIG. 6 is a diagram showing other examples of characteristics of correction values for compression conducted at high density region and low density region.

Though correction value f1 (Sus) is given, in all cases, as a linear function that decreases monotonically as unsharp mask signal Sus increases in the constitution of the above example, it is also acceptable as characteristics that a gradient changes as shown in FIG. 6. In this case, too, it is preferable that the compression rake (gradient) meeting the requirements of each of the low density region and the high density region is established differently.

Further, a method for changing the compression rate is not limited to that wherein the compression rate is changed by the aforementioned coefficient $\beta$, but the method wherein the compression rate is changed by other parameters is also acceptable.

In the aforesaid example wherein each of the high-density region and the low-density region is compressed based on a difference of compression rate and in other examples described below, a method for obtaining the aforesaid unsharp mask signal Sus is not limited to that wherein it is obtained through averaging processing in a mask region, but the method employing a median value, for example, can also be used.

Figure 7:
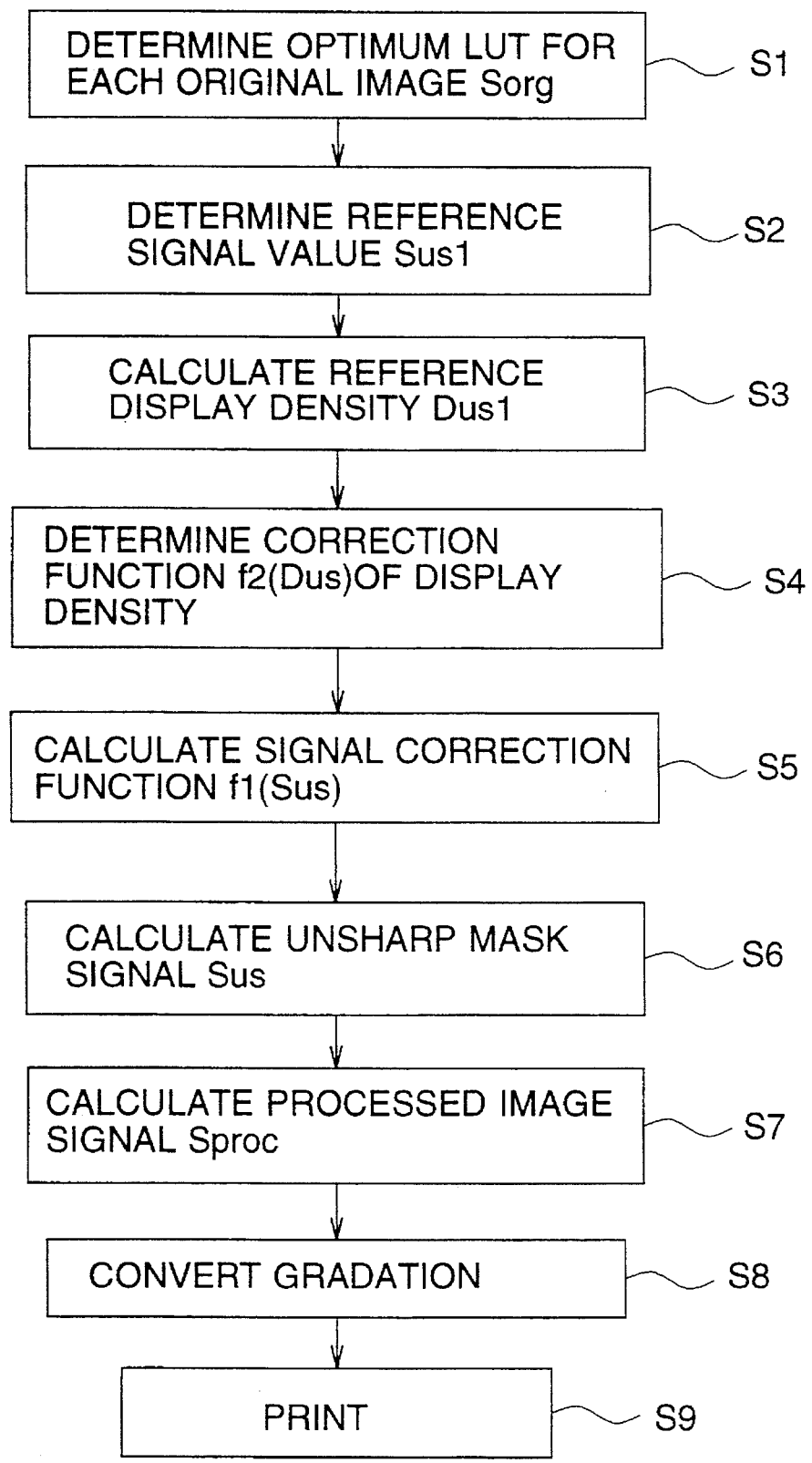
FIG. 7 is a flow chart showing a flow of compression processing corresponding to indicated density.

Though compression processing for optimum dynamic range is carried out on image signals in the aforesaid dynamic range compression, what is desired actually is that optimum density is reproduced in image reading when an image is displayed through a hard copy or a soft copy prepared by simple means of a display unit. Therefore, when dynamic range compression is carried out indifferently of density reproduction characteristics mentioned above Now, an example wherein dynamic range compression is carried out with density reproduction characteristics taken into consideration, referring to the flow chart in FIG. 7.

First of all, histogram analyses for the region of interest within an image are carried out based on original image signals Sorg, and then standard gradation conversion table LUT established in advance is rotated or is subjected to shift depending on the results of the aforesaid histogram analyses. Thus, gradation conversion table LUT which is optimum for each radiation image is determined (S1).

Next, based on the results of the aforesaid histogram analyses (for example, the maximum value, the minimum value or a median value), there is determined reference value Sus 1 of unsharp mask signal Sus which is to establish an region of dynamic compression (S2).

Then, display density Dus 1 corresponding to the aforesaid reference value Sus 1 is obtained by the use of the gradation conversion table LUT mentioned above (S3).

Figure 8:
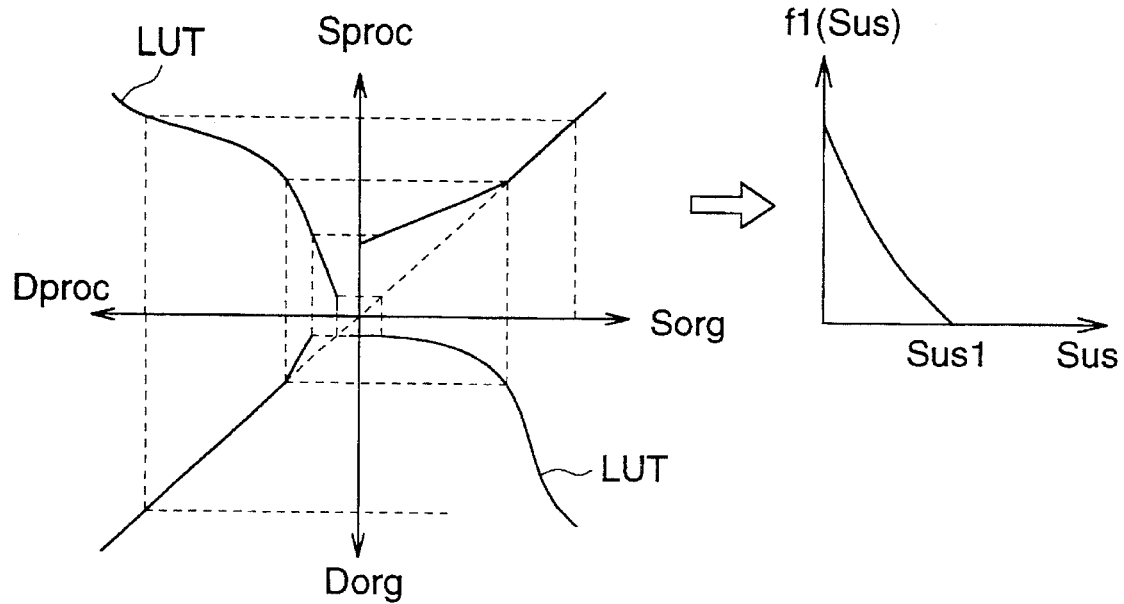
FIGS. 8 (a)–8 (c) are diagrams showing characteristics of compression processing each corresponding to density indicated.
Figure 8:
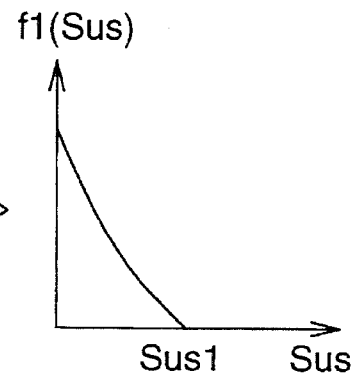
Figure 8:
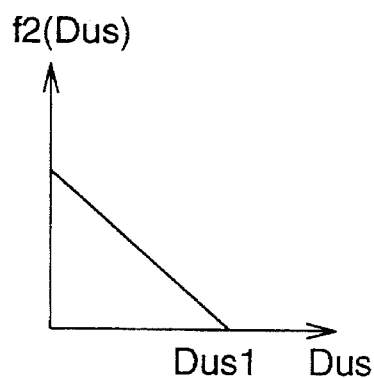

Next, display density correction function f2(Dus) expressed with the following linear function is determined with the aforementioned display density Dus 1 as a reference (S4 and FIG. 8 (b))

$$
\begin{aligned}
f2\ (Dus) &= \beta\ (Dus - Dus) & (Dus \leq Dus\ 1) \\
&= 0 & (Dus > Dus\ 1)
\end{aligned}
$$

Now, under the assumption that display density corresponding to original image signal Sorg is represented by Dorg and display density corresponding to the aforesaid processed image signal Sproc is represented by Dproc, the relation between the display density Dorg and the display density Dproc both satisfying Dproc=Dorg+f2(Dus)

will be obtained (third quadrant in FIG. 8(a)). The aforesaid display density Dproc represents data wherein display density Dorg corresponding to an original image is compressed at the low density region by density correction value f2(Dus) on a display density basis.

It is finally required that, when processed image signal Sproc subjected to dynamic range compression is converted by gradation conversion table LUT and displayed, characteristics which are consistent with the aforesaid display density Dproc are obtained.

For the above reason, display density Dproc corresponding to the aforesaid processed image Sproc and display density Dorg corresponding to original image Sorg are respectively converted to signal values through inverse transformation by simple means of the aforesaid gradation conversion table LUT, and the relation between original image signal Sorg and processed image signal Sproc both satisfying the relation of Dproc=Dorg+f2(Dus)

under a predetermined gradation conversion table LUT will be obtained (first coordinate in FIG. 8(a)).

Then, signal correction function f1 (Sus) that satisfies

Sproc=Sorg+f1 (Sus)

in the relation of signals obtained from the aforesaid display density through inverse transformation (first quadrant in FIG. 8 (a)) is calculated (see S5 and FIG. 8 (c)).

Then, unsharp mask signal Sus of each pixel is calculated from original image signal Sorg (S6), then the calculated unsharp mask signal Sus is converted into a correction value by the correction function f1 (Sus) obtained in the manner mentioned above, and original image signal Sorg is corrected by the correction value f1 (Sus), thus processed image signal Sproc is obtained (S7).

The processed image signal Sproc whose dynamic range has been compressed by the aforementioned correction function f1 (Sus) is converted by the aforesaid gradation conversion table LUT (S8) and then is outputted to a printer (display unit) for preparation of a hard copy (S9).

Incidentally, when the correction characteristics expressed by the linear function as shown in FIG. 8 (b) are set on the display density and the gradation conversion table LUTs shown in the second and fourth quadrants in FIG. 8 (a) are used, correction function f1 (Sus) for correcting the low density region of original image signal Sorg indicates the characteristics wherein the steeper gradient is shown as the unsharp mask signal Sus is lowered from the reference point Sus 1 as shown in FIG. 8 (c). The basis for this is the characteristic wherein the aforementioned gradation conversion table LUT shows generally a gradient that becomes more gentle on the low density region and the high density region.

When there is carried out dynamic compression wherein density reproduction characteristics of a display unit such as a printer and CRT to which processed image signals Sproc are outputted are taken into consideration, it does not happen that sufficient compression effects can not be obtained on the displayed image despite the desired compression carried out on the image signal. Thus, it is possible to carry out dynamic compression that is optimum on the state of the final display.

In the example mentioned above, the relation of display density is transformed inversely to the relation of image signals by the use of gradation conversion table LUT, and signal correction function f1 (Sus) is established so that desired dynamic range compression may be carried out on the displayed density. However, it is also acceptable that signal correction function f1 (Sus) is established in a simple manner through consideration of the characteristics of gradation conversion table LUT.

Namely, for realizing the correction of characteristics expressed by a linear function on the display density in terms of characteristics of general gradation conversion table LUT, there is required the characteristic of signal correction function f1 (Sus) wherein unsharp mask signal Sus shows a steeper gradient in the high density region or the low density region as shown in FIG. 8 (c).

Figure 9:
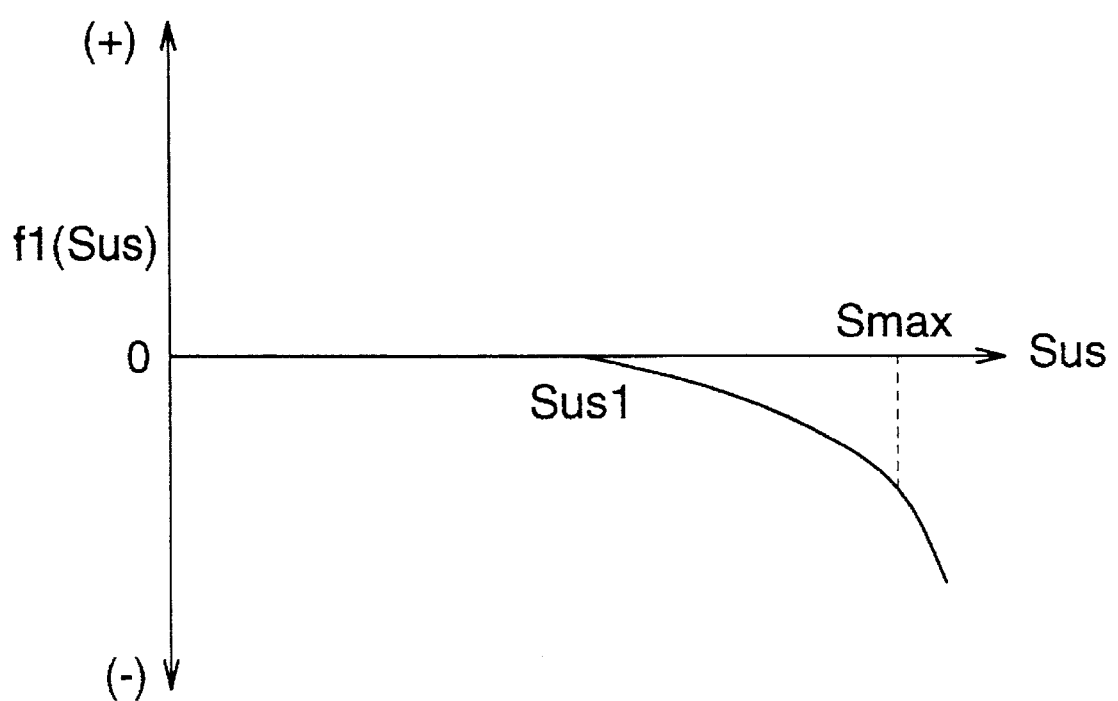
FIG. 9 is a diagram showing a function form of a correction value wherein indicated density characteristics are taken into account.

Therefore, when compression at the high density region is carried out taking the aforementioned requirements into consideration in advance as shown in FIG. 9, for example, in the constitution wherein dynamic compression is carried out through calculation of Sproc=Sorg+f1 (Sus), it is required to establish correction function f1 (Sus) which increases reduction rate as unsharp mask signal Sus increases.

The aforementioned correction function f1 (Sus) shown in FIG. 9 is represented by the following expressions.

$$f1(Sus) = \beta(Sus1 - Sus)^2 \quad (Sus \geq Sus1)$$
$$= 0 \quad (Sus < Sus1)$$

In this case, it is preferable that the aforesaid reference value Sus is determined based on histogram analyses of original images. For example, it is determined to be an average value of the maximum signal value and the minimum signal value both in an region of interest. Coefficient $\beta$, on the other hand, was obtained from $$\beta = k/(Sus1 - Smax)$$

when the maximum signal value in the region of interest is represented by Smax. The aforesaid k is a constant which is preferably within a range of $0.5 \leq k \leq 1.5$. However, the reference value used for calculating the aforesaid $\beta$ is not limited to the maximum value Smax.

In the case of the constitution for establishing the form of a function in which characteristics of gradation conversion table LUT are considered as stated above without establishing a signal correction function by transforming inversely the actual display density from gradation conversion table LUT, signal correction function f1 (Sus) can be established in a simple manner though its accuracy is lowered.

Incidentally, in the example mentioned above, compression at the high density region is established so that it may conform mostly to the characteristic of gradation conversion table LUT. However, it is also possible to establish at the low density region, and in the constitution wherein a dynamic range is compressed through calculation of Sproc=Sorg+f1 (Sus), it is required to establish a function wherein the increase rate of correction value f1 (Sus) increases as unsharp mask signal Sus decreases.

Namely, it is required to establish a function wherein the absolute value of the variation rate of the aforementioned correction value f1 (Sus) against the aforesaid unsharp mask signal Sus increases gradually as unsharp mask signal Sorg decreases with respect to correction value f1 (Sus) for increasing original image signal Sorg for correction, and increases gradually as unsharp mask signal Sus increases with respect to correction value f1 (Sus) for decreasing original image signal Sorg for correction.

Incidentally, a dynamic range of original radiation image Sorg changes in accordance with an object. Therefore, when dynamic compression is carried out at a constant compression rate, the compression rate is sometimes too high and sometimes too low, resulting in compression processing which is not optimum.

Now, an example wherein a compression rate or a compression method for dynamic range compression is changed in accordance with information of an object will be explained as follows.

Figure 10:
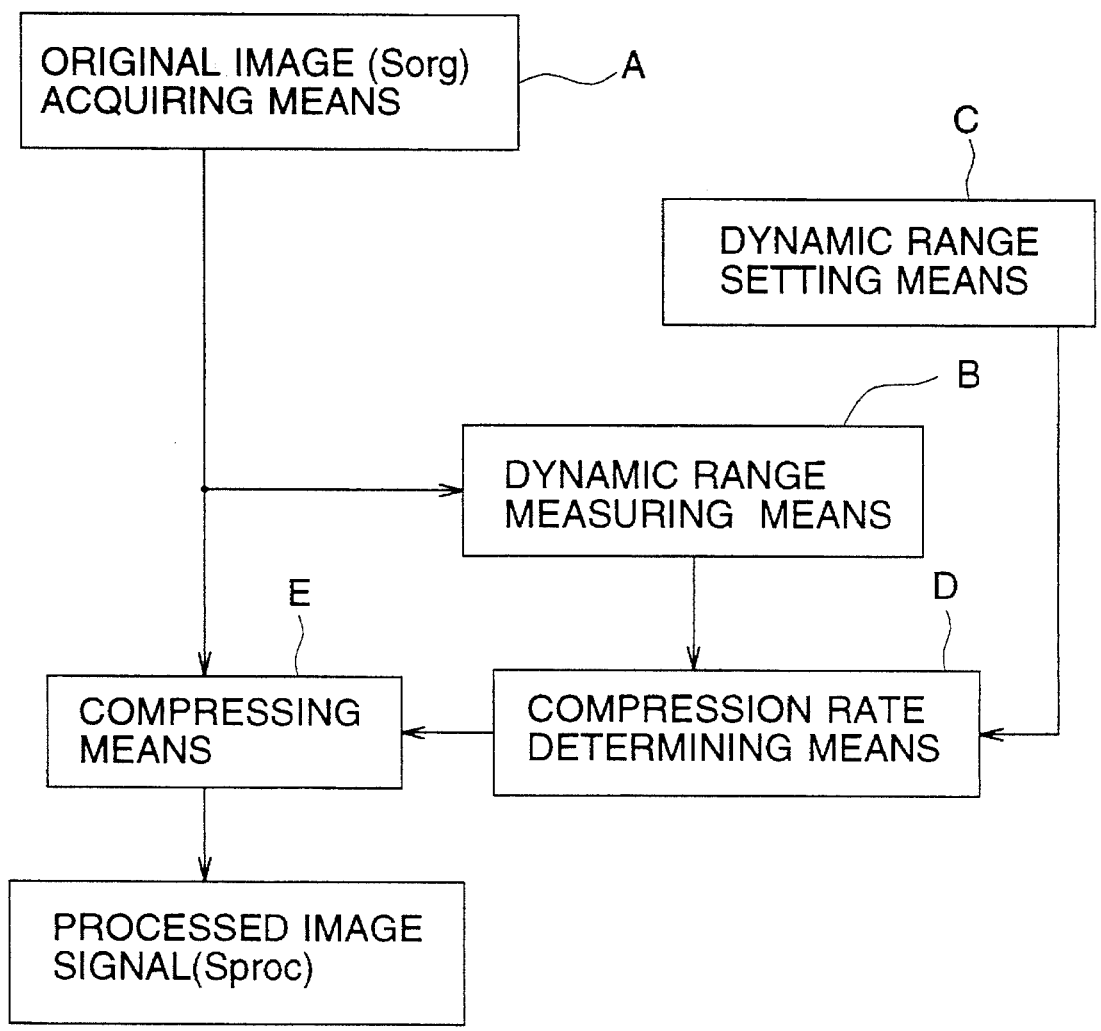
FIG. 10 is a block diagram of an example wherein compression characteristics are changed in accordance with information of an object.

FIG. 10 is a block diagram showing the basic constitution of an example wherein a compression rate is changed in accordance with a dynamic range of an object (object information).

In this case, original image signal Sorg acquiring means A is represented by those including a method for obtaining through photoelectric conversion of stimulated emission caused by scanning stimulable phosphor with stimulating beam, a method for reading an image on an X-ray film through photoelectric conversion, and a method wherein radiation transmitted through an object is projected on a phosphor to be converted into fluorescence which is read through photoelectric conversion.

Dynamic range measuring means B is a means for measuring dynamic range of an object, and in an example thereof, the maximum signal value and the minimum signal value both in an object image region are obtained from histogram analyses of original image signal Sorg, which determines a dynamic range of the object, Another constitution wherein the maximum signal value and the minimum signal value are obtained from profile information of an original image is also acceptable.

Further, a method for detecting a dynamic range of an object without using image information is also acceptable. For example, a method wherein intensity distribution of radiation transmitted through an object is measured directly, or the aforesaid radiation is converted into light temporarily and intensity distribution to the light is measured and thickness of the object is further measured is also acceptable.

Dynamic range establishing means C is a simple means of how to establish dynamic range of processed image signal Sproc. For example, it is of the constitution wherein an operator inputs and establishes through key board operation, or of the constitution wherein a dynamic range is stored in a unit as a fixed value. In the further constitution, an operator selects from plural fixed values, or the operator changes the fixed value for establishing.

Compression rate determining means D is a means wherein a compression rate used for carrying out dynamic range compression by means of compressing means E stated later is variably established.

In this case, the compression rate is defined as "compression rate=(dynamic range of processed image signal Sproc)/ (dynamic range of original image signal Sorg)", and the fall of the compression rate is assumed to be an increase of the degree of compression.

Figure 11:
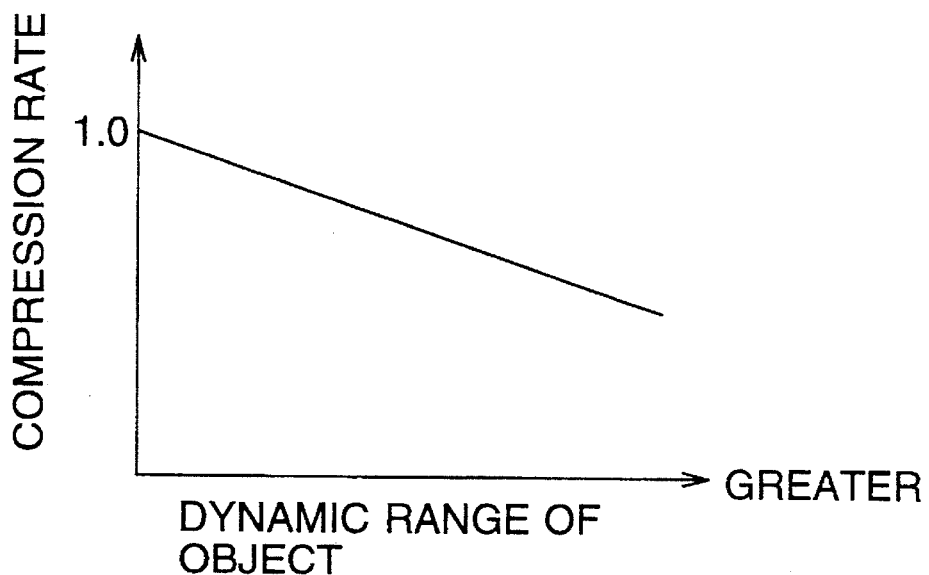
FIG. 11 is a diagram shoeing an example of compression rate characteristics corresponding to a dynamic range of an object.
Figure 12:
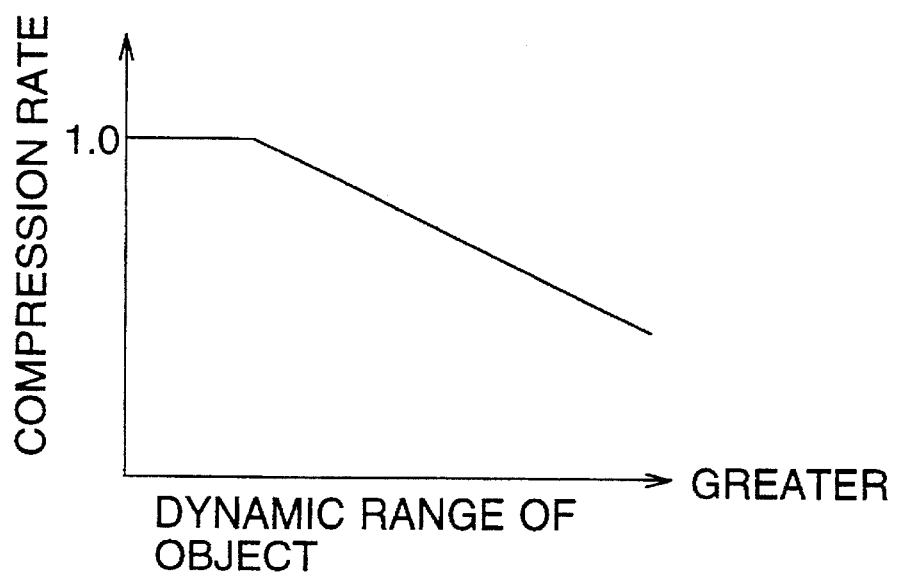
FIG. 12 is a diagram showing another example of compression rate characteristics corresponding to a dynamic range of an object.
Figure 13:
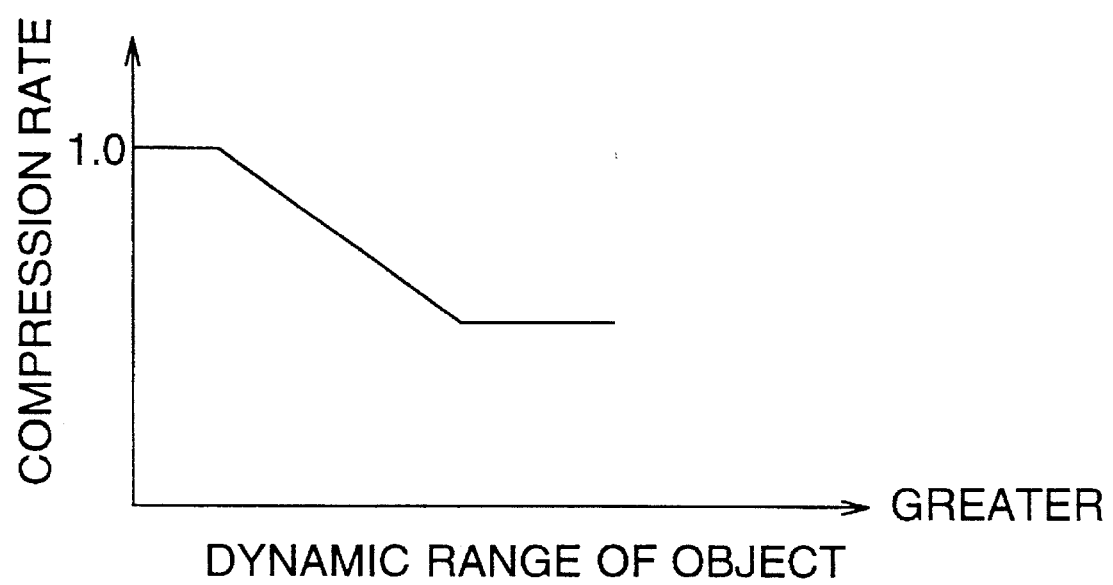
FIG. 13 is a diagram showing further example of compression rate characteristics corresponding to a dynamic range of an object.

In the aforementioned compression rate determining means D, it is possible to adopt the constitution wherein conversion tables shown in FIGS. 11–13 converting dynamic range of an object into the compression rate are provided, and the conversion tables are referred for determining the compression rate.

It is further possible to adopt the constitution wherein the ratio of dynamic range (reference dynamic range) of processed image signal Sproc established through the aforementioned dynamic range establishing means C to dynamic range of an object measured through the aforementioned dynamic range measuring means B is calculated, and the compression rate is established so that a dynamic range of processed image signal Sproc may agree with the reference dynamic range.

In the case of the constitution wherein the compression rate is changed in accordance with the dynamic range of an object as stated above, it is possible to avoid that overs and shorts of compression rate are caused by the difference of physical features of an object (human body), or the dynamic range of processed image signal Sproc varies widely, thus it is possible to offer stable processed images.

Compressing means E can employ the constitution wherein processed image signal Sproc whose dynamic range is compressed can be obtained by correcting original image signal Sorg with correction value f1 (Sus) that is a function of unsharp mask signal Sus, as in the aforementioned example. When Sproc=Sorg−f1 (Sus) is satisfied, the aforesaid correction value f1 (Sus) is a function that increases monotonically as unsharp mask signal Sus increases, while when Sproc=Sorg+f1 (Sus) is satisfied, the aforesaid correction value f1 (Sus) is a function that decreases monotonically as unsharp mask signal Sus increases.

The aforesaid correction value f1 (Sus) can concretely be given as f1 (Sus)=β(Sus−Sus 1), for example. In this expression, when the coefficient β (0≦β≦1.0) mentioned above is changed, the compression rate is changed, and the compression rate is shown as (1−β)/1 in the expression above. Therefore, it is possible to carry out processing which is based on the established compression rate by obtaining the aforesaid coefficient β from the established compression rate.

Incidentally, it is also possible to adopt the constitution wherein the aforesaid coefficient β is determined directly instead of determining the compression rate through the compression rate determining simple means β mentioned above.

Further, the compressing means E mentioned above can also employ the constitution wherein compression is carried out through convolution operation in addition to the constitution wherein unsharp mask signal Sus is used.

Figure 14:
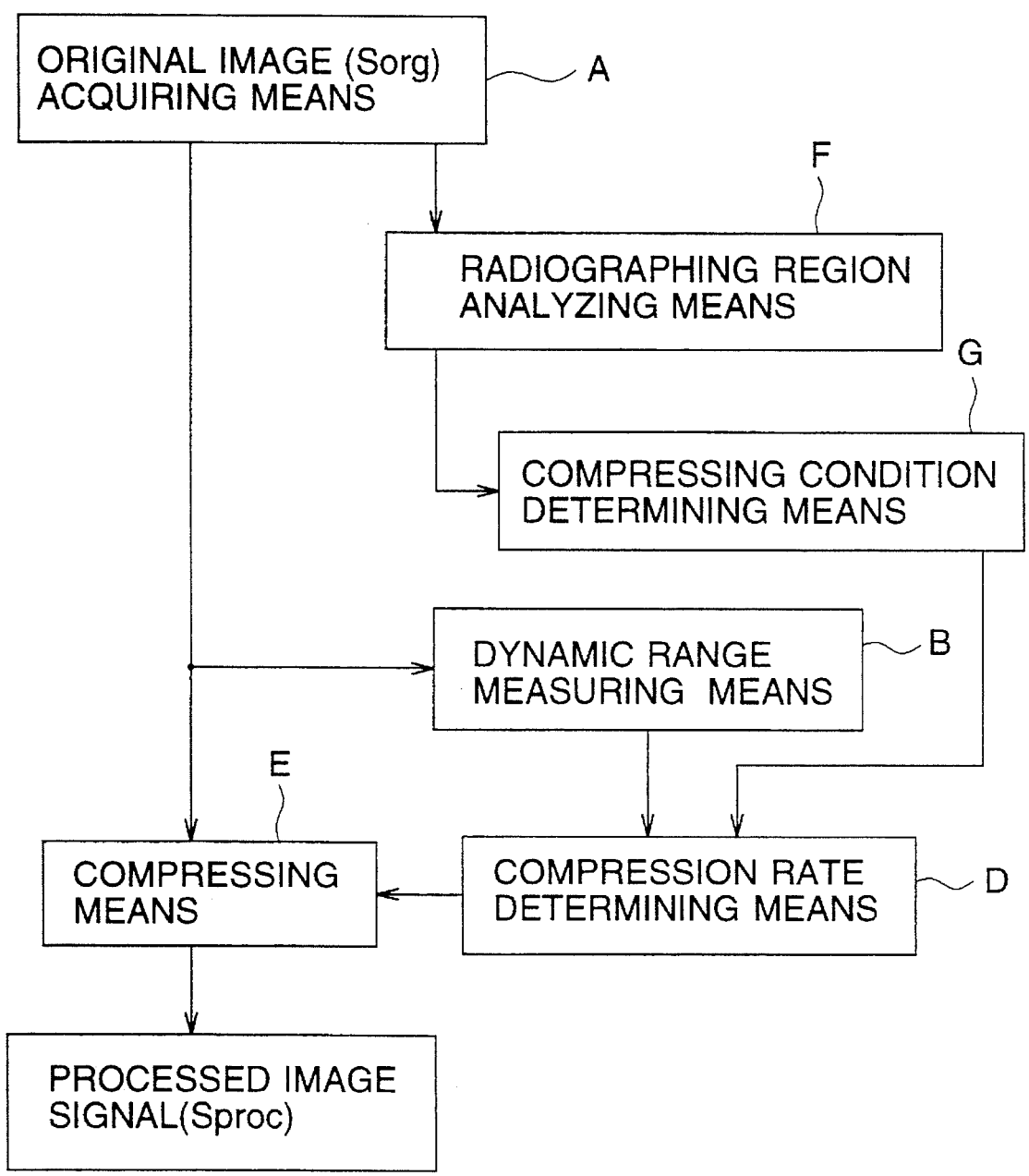
FIG. 14 is a block diagram of an example wherein compression characteristics are changed in accordance with information of an object.

FIG. 14 is a block diagram showing the basic constitution of an example wherein the compression rate is changed in accordance with dynamic range of an object and the compression conditions are determined based on the results of analyses of radiographing regions (object information). Incidentally, elements in FIG. 14 which are the same as those in the block diagram in FIG. 10 are given the same symbols respectively, and the detailed explanation is omitted.

In FIG. 14, radiographing region analyzing means F is a means which analyzes the radiographing region of an object based on original image signal Sorg, and it is possible to employ radiographing region analyzing methods which are widely known such as, for example, histogram analyses, contour extraction, and profile analyses. It is further possible to adopt the recognition in which a neural network is used, and it is still further possible to employ the constitution wherein the radiographing region is analyzed by the combination of the analyzing methods mentioned above.

Compression condition determining means G is a simple means which determines various conditions for image processing compressing dynamic range in accordance with the radiographing region analyzed by the aforementioned radiographing region analyzing means F, and it determines the following conditions actually.

a. Compression method used in compressing means E

This selects either an unsharp mask method or a convolution operation methods (convolution method) depending on the region to be radiographed.

b. Correction function form

In the case of using the unsharp mask method, for example, when signal correction function f1 (Sus) is given as f1 (Sus)=β (Sus 1−Sus), the value of the aforesaid coefficient β or of reference value Sus 1 is changed in accordance with the radiographing region.

c. Dynamic range of processed image signal

A plurality of fixed values for dynamic range after processing are stored for each radiographing region, and the value of dynamic range is selected from the stored values mentioned above in accordance with the analyzed radiographing region.

Or, a plurality of tables for converting dynamic range of an object into compression rate are prepared for each radiographing region so that selection may be made from the plural conversion tables in accordance with the analyzed radiographing region.

Figure 15:
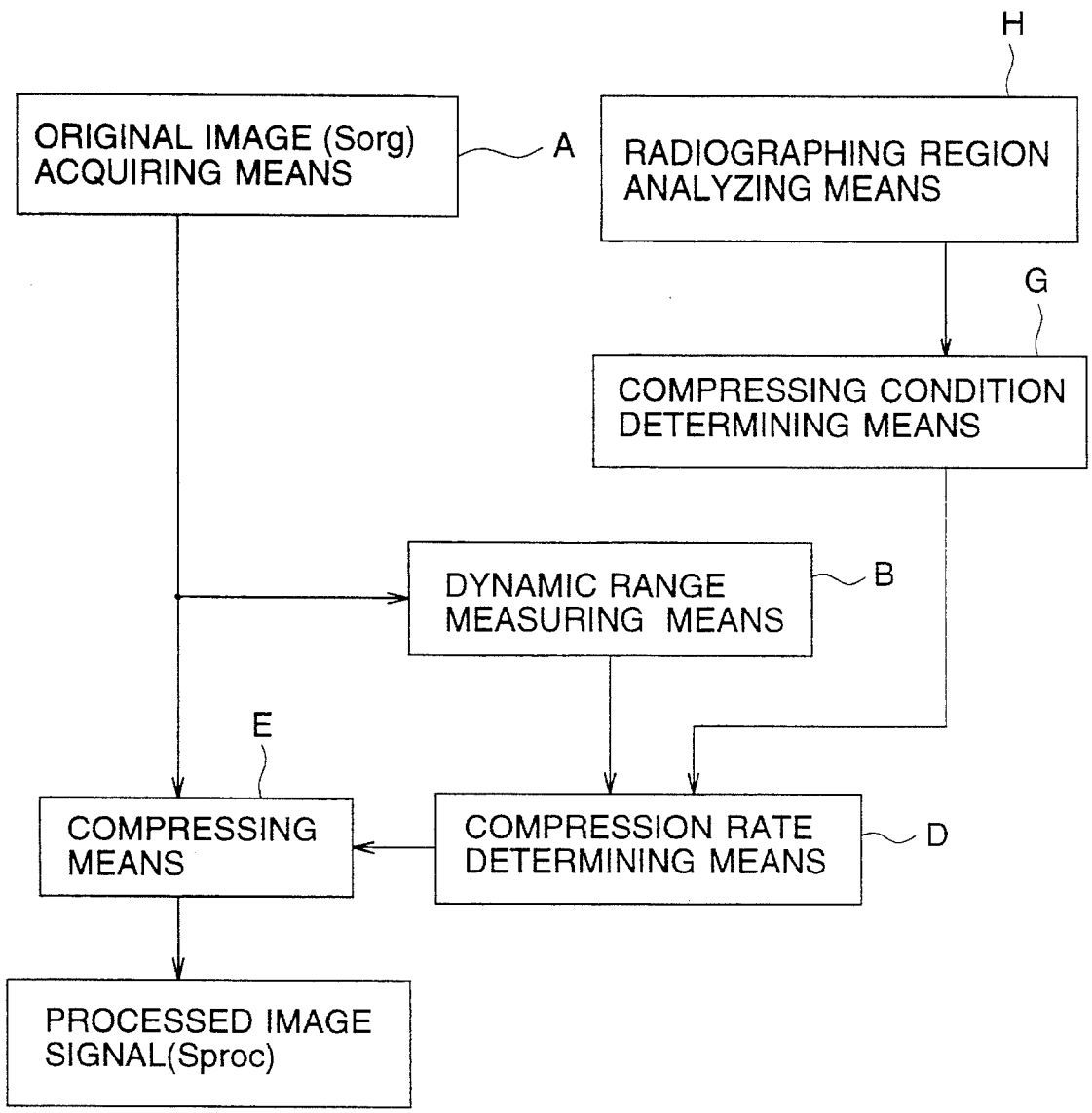
FIG. 15 is a block diagram of an example wherein compression characteristics are changed in accordance with information of an object.

Though a radiographing region is obtained through analyses of signals of original image signal Sorg in the example mentioned above, it is also possible to employ the constitution wherein information of a radiographing region are inputted through operation of an operator, and the constitution corresponding to the above example is shown in a block diagram in FIG. 15.

In FIG. 15, radiographing region inputting means H is a means for inputting data showing where the radiographing region is in a radiation image to be compressed, and it has the constitution wherein an operator operates a key board to input radiographing region information directly or selects processing menu set in advance.

Incidentally, it is also possible to adopt the constitution wherein image processing conditions according to the radiographing region are inputted simultaneously with the aforesaid radiographing region information.

In compression condition determining means G, a method of compression processing, a function form and dynamic range after processing are determined in accordance with radiographing region information, in the same way as in the aforesaid example.

When compression conditions are established variably based on radiographing region information of an object as stated above, it is possible to cope with the change of desired compression rate according to the radiographing region, to avoid overs and shorts of the compression rate caused by the change of radiographing regions, and to carry out optimum compression processing stably.

Incidentally, in the case of the constitution wherein the compression rate (compression degree) is changed based upon information of dynamic range of an object as stated above, it is preferable to adopt the constitution wherein the maximum value of compression rate is set in advance, and when the compression rate exceeding the aforesaid maximum value is set based on dynamic range information of an object, the compression rate is limited to the aforesaid maximum value and establishment of the compression rate exceeding the maximum value is prohibited.

In the example mentioned above, a mask size or a frequency characteristic of an unsharp mask is an important parameter that affects diagnosing faculties of an image.

In the dynamic range compression processing, only ultra low frequency components corresponding to the change in the rough structure of an object (smooth signal difference of a lung regions or a mediastinum region) are extracted as unsharp mask signal Sus, and correction value f1 (Sus) is established based on the Sus. Thus, it is possible to compress the total density range while maintaining the change in fine fabrics (bones and blood vessels).

When a mask size is small, not only ultra low frequency components corresponding to rough change in an object but also frequency components corresponding to the change in fine fabrics are contained in unsharp mask signal Sus, thus, the change in fine fabrics is erased by adding the correction value based on the unsharp mask signal Sus, and contrasts on bones and blood vessels are lowered.

When a mask size is large, on the other hand, a sharp edge of an unsharp image at the portion where signal values change sharply is worsened, and undesirable compression is carried out in the vicinity of a border line between an region where compression is desired and an region where compression is not desired. Further, when a mask size is excessively large, even frequency components corresponding to the rough change in an object are lost (a flat image in an extreme case). Therefore, effects of dynamic compression can not be obtained even when a correction value based on unsharp mask signal Sus is added.

After the inventors of the invention studied from the aforementioned viewpoints, they found that a mask size ranging from 10 mm to 60 mm in terms of a length on a life size image is preferable, that ranging from 15 mm to 30 mm is more preferable and that ranging from 20 mm to 30 mm is the most preferable.

When the mask size is smaller than 10 mm, frequency components corresponding to the change in fine fabrics increase sharply. Therefore, if a correction value is established based on the unsharp mask signal Sus obtained with that mask size, diagnosing faculties are lowered remarkably. In a chest image and an abdomen image, in particular, when a mask size is 15 mm or more, Sus does not have frequency components corresponding to thick blood vessels such as aortas, and when it is 20 mm or more, Sus does not contain frequency components with which the contrast is not desired to be lowered though the relatively low frequency corresponding to a rib is contained. Therefore, an image having high diagnosing faculties can be obtained.

In this case, a mask size represents a simple mean value of the length of a short side and that of a long side for a rectangle, the length of one side for a square, a diameter for a circle and a simple mean value of the major axis and the minor axis for an ellipse.

Further, when describing with a frequency characteristic owned by an unsharp mask in place of a mask size, it is preferable that the frequency characteristic is not less than 0.5 and not more than 0.5 respectively when the modulation transfer function of the unsharp mask is 0.01 cycle/mm and 0.06 cycle/mm, and it is more preferable that the frequency characteristic is not less than 0.5 and not more than 0.5 respectively when the modulation transfer function of the unsharp mask is 0.02 cycle/mm and 0.04 cycle/mm, and it is further preferable that the frequency characteristic is not less than 0.5 and not more than 0.5 respectively when the modulation transfer function of the unsharp mask is 0.02 cycle/mm and 0.03 cycle/mm.

Incidentally, in the averaging processing for obtaining unsharp mask signal Sus as in the invention, it is possible to prevent deterioration of a sharp edge of an unsharp image located at the portion where signal values change sharply, by conducting weighting corresponding to the absolute value of a difference of signals between a central pixel and a peripheral pixel both in a mask region and/or conducting weighting weighting corresponding to the positional relation between a central pixel and a peripheral pixel both in a mask region, and it is also possible to expand the preferable range of a mask size from 10 mm–60 mm to 10 mm–80 mm.

Further, in the invention, it is preferable that the maximum value of the absolute value of correction value f1 (Sus) that is a function of unsharp mask signal Sus is from ⅛ to ½ of the dynamic range in an region of interest of an object. For example, when the dynamic range of an region of interest of an object shows the two-digit value, it is preferable that the maximum value of the absolute value of the compression correction amount is ¼-digit to 1-digit.

When correction value f1 (Sus) is expressed by a linear function of unsharp mask signal Sus like $\beta$ (Sus 1–Sus), the preferable range of $\beta$ representing the gradient and determining the compression degree is from 0.2 to 1.0, and more preferable one is from 0.4 to 0.8.

When the correction amount is too small, effects of dynamic compression are not exhibited, while, when the correction amount is too large, the relation of density levels on each region of an original image is reversed (for example, an average density of a mediastinum region becomes higher than that of a lung regions), resulting in an image which is too poor for diagnosis. For example, the problem of this kind takes place when the aforementioned linear function represented by $\beta$ is set to be larger than 1.

In the case of a dynamic range compression method related to the invention, even when a sharp change of signals is made in a mask region to be used for calculation of aforesaid unsharp mask signals in a compression method for compressing the dynamic range based on the aforesaid unsharp mask signals, it is possible to avoid, as stated above, that such change of signals affect greatly the unsharp mask signals, and thereby to avoid occurrence of an artifact caused by compression processing.

Further, in a compression processing employing unsharp mask signals, when a high density region and a low density region are subjected to compression processing respectively at different compression degrees, both regions having respectively different densities can be subjected to simultaneous compression so that each of them can be compressed in a manner optimum for its requirements.

It is further possible to carry out, in a simple way, dynamic range compression that is almost suitable for requirements on the display image, by establishing a function of a correction value following a tendency of gradation conversion characteristics in display.

Since compression characteristics are changed based on information of a dynamic range of an object and of radiographing regions thereof, it is possible to avoid that overs and shorts of a compression degree are caused, which is an effect.

In addition, since a desired dynamic compression characteristic on a display density is set, and an image signal compressed by the dynamic compression characteristic is obtained, when a radiation image whose dynamic range is finally compressed is displayed, it is possible to obtain desired compression effects surely.

In this case, in the aforementioned image processing apparatus 14 shown in FIG. 1, there is provided an image processing function which compresses a dynamic range of original image signal Sorg to be inputted and thereby obtains processed image signal Sproc carrying an image whose dynamic range is narrower than that of an original image. Image processing for such dynamic range compression is carried out in accordance with the following expression mentioned above.

Sproc=Sorg+f1 (Sus)

In the above expression, Sus represents an unsharp mask signal obtained by averaging original image Sorg in a predetermined mask region including each pixel point corresponding to each pixel point. However, a method for obtaining the unsharp mask signal Sus mentioned above is not limited to the method for obtaining it through averaging of the inside of a mask region. For example, a method employing a median value can also be used.

Figure 16:
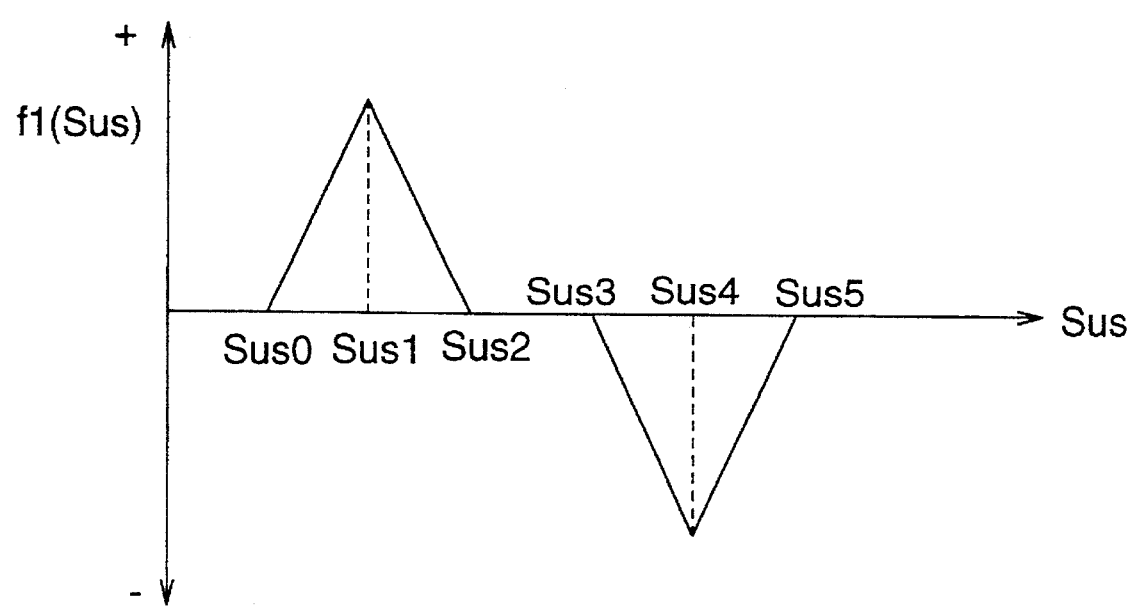
FIG. 16 is a diagram showing a function form of a correction value in an example.

Further, f1 (Sus) which is added to original image signal Sorg is a correction value to be obtained as a function of unsharp mask signal Sus, and it is established, for example, to a function form shown in FIG. 16.

The function form shown in FIG. 16 is as follows when it is indicated through expression (4).

Expression 4

$$f1(Sus) = \begin{cases} 0 & (Sus < Sus0) \\ \beta_1(Sus - Sus0) & (Sus0 \leq Sus < Sus1) \\ \beta_2(Sus2 - Sus) & (Sus1 \leq Sus < Sus2) \\ 0 & (Sus2 \leq Sus < Sus3) \\ \beta_3(Sus3 - Sus) & (Sus3 \leq Sus < Sus4) \\ \beta_4(Sus - Sus5) & (Sus4 \leq Sus < Sus5) \\ 0 & (Sus \geq Sus5) \end{cases}$$

In the correction value f1 (Sus) having the characteristics mentioned above, it is arranged so that reference unsharp mask signal Sus i (i=0–5) which serves as a reference for the correction value change can be obtained through Sus i=ki·Smax+(1−ki)·Smin when the maximum signal value and the minimum signal value both in an region of interest of an original image are represented respectively by Smax and Smin. The aforesaid coefficient ki (i=0–5) is arranged to take k0=−0.8, k1= −0.2, k2=0.5, k3=1.0, k4=1.5 and k5=1.8, for example. With regard to the aforesaid coefficients k0, k1, k4 and k5, in this case, it is arranged that Sus 0, Sus 1, Sus 4 and Sus 5 determined respectively by the aforesaid coefficients are set outside the signal range of an region of interest.

The correction value f1 (Sus) having aforesaid characteristics decreases monotonically as unsharp mask signal Sus increases in the signal range of Sus 1–Sus 4, while correction value f1 (Sus) taking the positive maximum value at reference value Sus 1 (median value Sus A) decreases monotonically as unsharp mask signal Sus decreases in the signal region lower than the reference value Sus 1 Further, correction value f1 (Sus) taking the negative minimum value at reference value Sus 4 (median value Sus B) increases monotonically as unsharp mask signal Sus increases in the signal region exceeding the reference value Sus 4.

Incidentally, in the assumption of "monotonical decreasing" and "monotonical increasing", f1 (Sus) does not need to decrease or increase as unsharp mask signal Sus increases, and an region where f1 (Sus) does not change even when Sus changes can exist partially.

Figure 17:
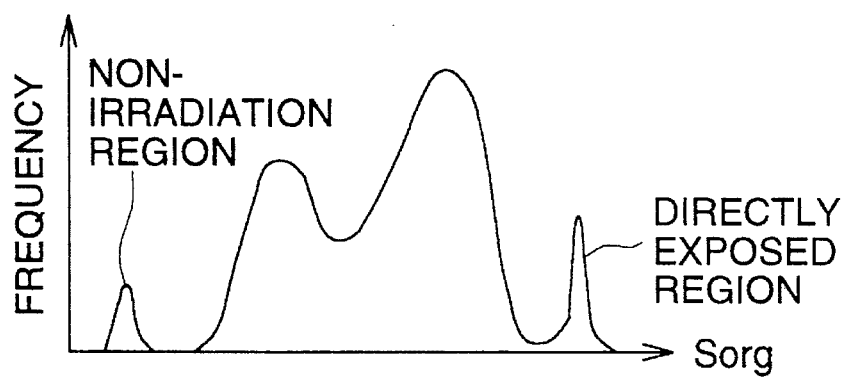
FIGS. 17 (a)–17 (c) are histogram diagrams for explaining processing characteristics in examples.
Figure 17:
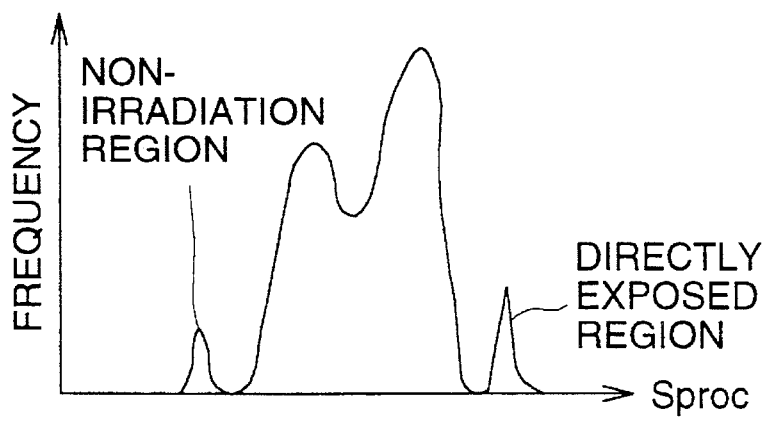
Figure 17:
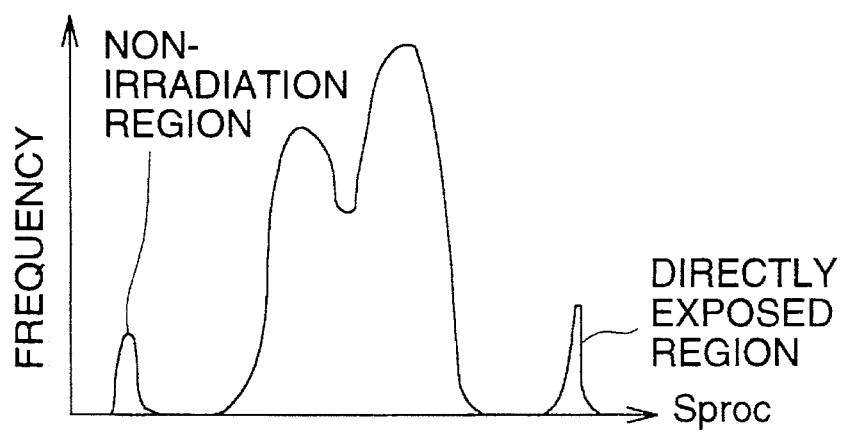

In this case, it is assumed that results of histogram analyses for the aforesaid original image signal Sorg show the characteristics shown in FIG. 17 (a) and a human body section which is an region of interest contains a directly exposed region where the signal value is extremely large and a non-irradiation region where the signal value is extremely small.

Figure 18:
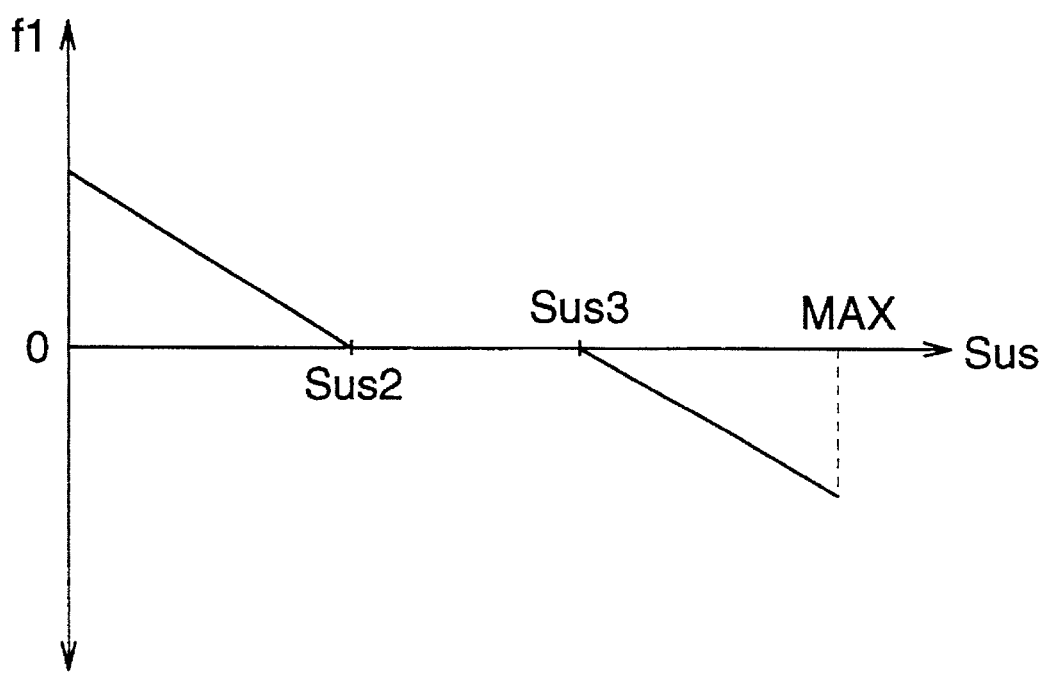
FIG. 18 is a diagram showing a function form of a general correction value.

Let it be assumed that correction value f1 (Sus) for correcting the aforesaid original image signal Sorg increases without fail as unsharp mask signal Sus decreases in a signal region lower than reference value Sus 2, for example, and it decreases without fail as unsharp mask signal Sus increases in a signal region higher than reference value Sus 3, as shown in FIG. 18.

In this case, the greater the signal value is, the more the signal Sorg is corrected to decrease, while the smaller the signal value is, the more the signal Sorg is corrected to increase. Therefore, signal values on the directly exposed region and the non-irradiation region approach greatly the signal values on the region of interest (see FIG. 17 (b)), and a difference of signal values between the region of interest and the directly exposed region or between the region of interest and the non-irradiation region can not be maintained clearly, which is not preferable.

Contrary to the foregoing, in the correction characteristics in the present example shown in FIG. 16 and Expression 4, correction exceeding greatly the maximum correction degree in an region of interest is not given at least on the region outside the region of interest, though the high density region and the low density region both in the region of interest are compressed. Therefore, it is possible to avoid that signals corresponding to the portions of a directly exposed region and a non-irradiation region are corrected more than needed, and thereby to carry out compression on the region of interest while keeping the difference of signals between the region of interest and the directly exposed region or between the region of interest and the non-irradiation region (see FIG. 17 (c)).

In the correction characteristics shown in the aforesaid FIG. 16, the correction value decreases monotonically as mask signal Sus decreases in the region where the mask signal value is lower than reference value Sus I (median value Sus A), while it increases monotonically as mask signal Sus increases in the region where the mask signal value exceeds reference value Sus 4 (median value Sus B). However, if the correction degree does not show the increasing change in the low density region and high density region both located outside the reference values Sus 1 and Sus 4, the effect can be exhibited. Accordingly, the function form is not limited to those shown in FIG. 16, but various function forms shown below can be used.

Figure 19:
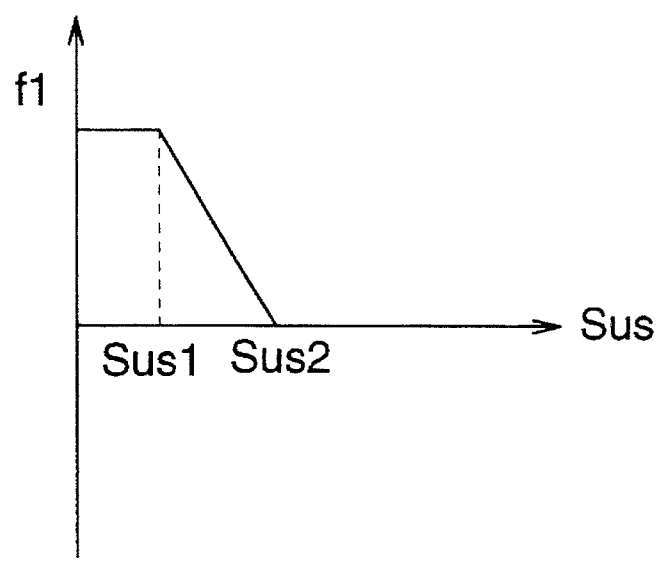
FIG. 19 is a diagram showing a different pattern of a function form of a correction value in an example.
Figure 20:
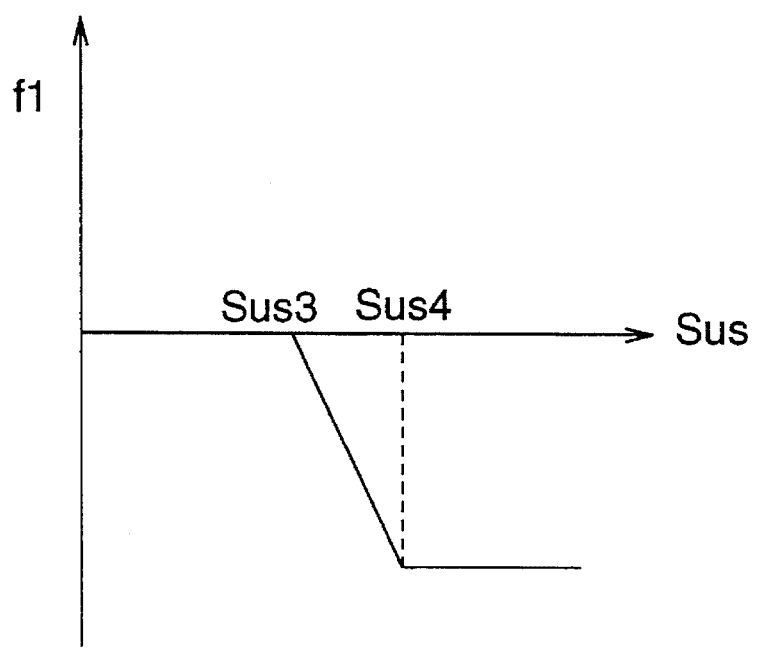
FIG. 20 is a diagram showing a different pattern of another function form of a correction value in an example.

In the function forms shown in FIGS. 19 and 20, correction value f1 (Sus) that takes the positive maximum value at reference value Sus 1 (median value Sus A) is fixed to the aforementioned positive maximum value in the signal region lower than the reference value 1 and correction value f1 (Sus) that takes the negative minimum value at reference value Sus 4 (median value Sus B) is fixed to the aforementioned negative minimum value in the signal region higher than the reference value 4.

Incidentally, there may also be used the constitution wherein function forms shown in FIG. 19 and FIG. 20 are combined and the low density region and the high density region are compressed simultaneously.

Figure 21:
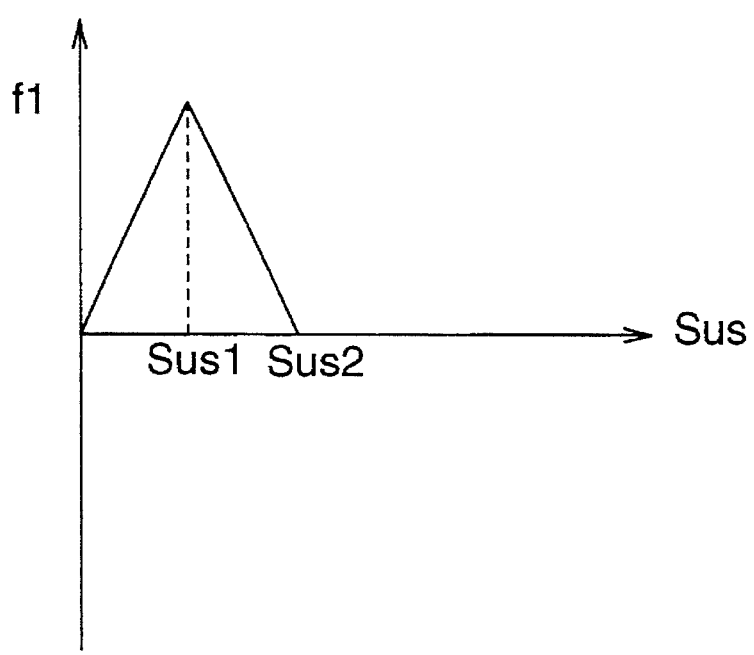
FIG. 21 is a diagram showing a different pattern of still another function form of a correction value in an example.
Figure 22:
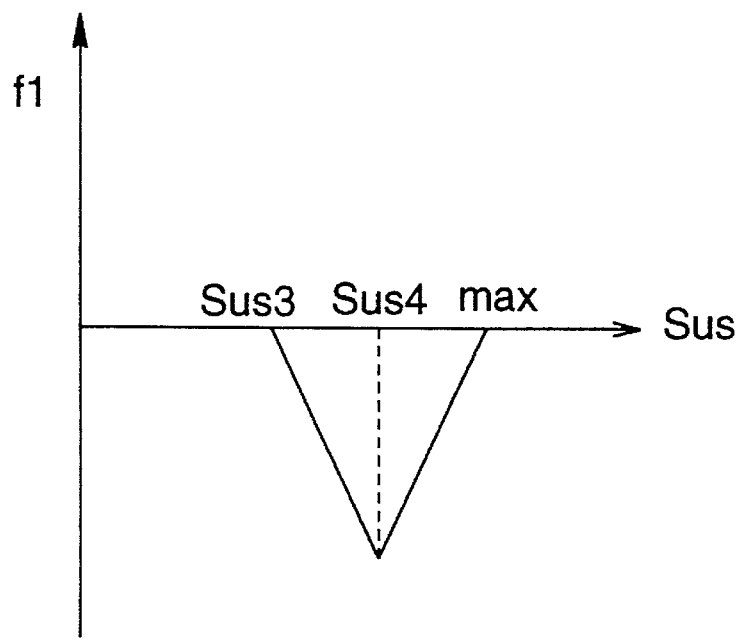
FIG. 22 is a diagram showing a different pattern of further function form of a correction value in an example.
Figure 23:
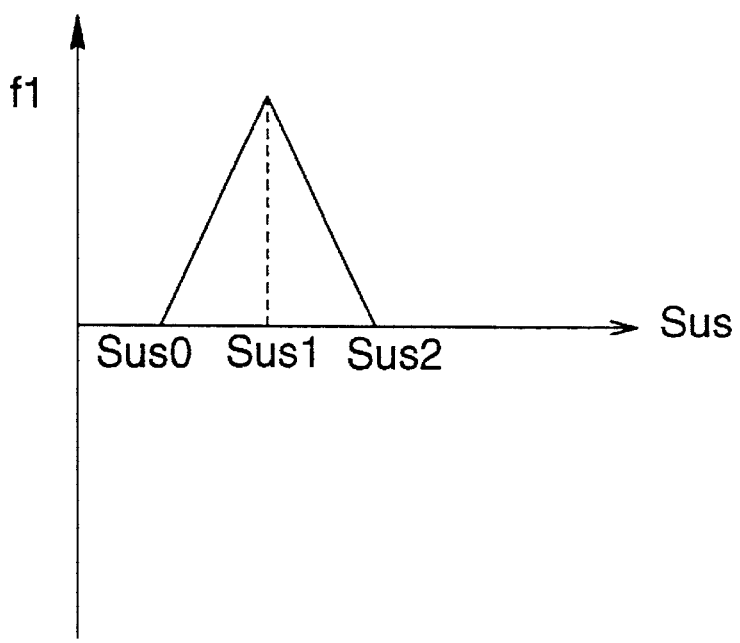
FIG. 23 is a diagram showing a different pattern of still further function form of a correction value in an example.
Figure 24:
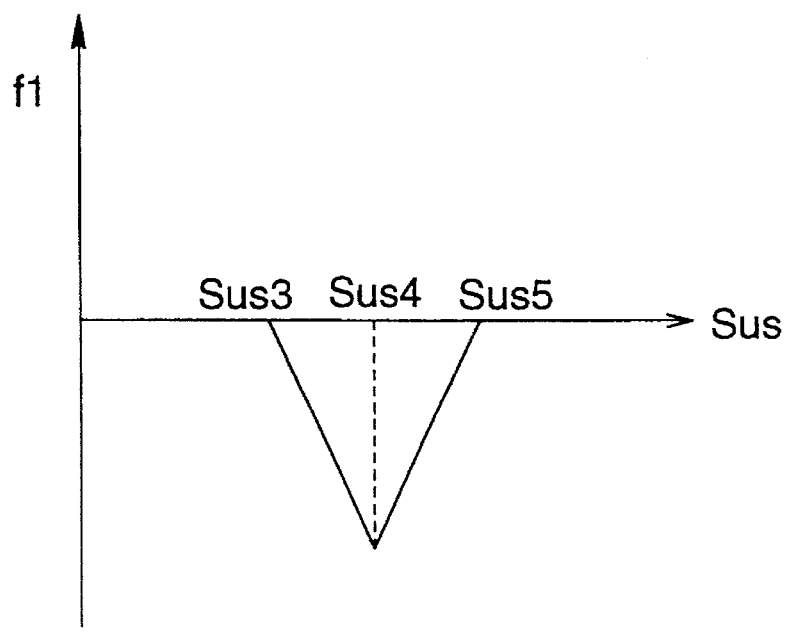
FIG. 24 is a diagram showing a different pattern of still further function form of a correction value in an example.

In the characteristics of the function forms shown in FIG. 21 and 22, correction value f1 (Sus) changes to decrease surely as mask signal Sus decreases in the signal region lower than reference value Sus 1, while the correction value f1 (Sus) changes to increase surely as mask signal Sus increases in the signal region higher than reference value Sus 4, Namely, in the function forms shown in FIG. 16, an region where correction value f1 (Sus) does not change despite the change of mask signal Sus exists in the signal region lower than reference value Sus 1 and the signal region higher than reference value Sus 4. However, the function forms shown in FIGS. 21 and 22 show the pattern in which an region where no change is shown does not exist.

Incidentally, there may also be used the constitution wherein function forms shown in FIG. 21 and FIG. 22 are combined and the low density region and the high density region are compressed simultaneously.

In the function forms shown in FIG. 16, the low density region and the high density region are compressed simultaneously. However, there may also be used the constitution wherein the function form is divided into the low density region and the high density region and either one of them only is compressed.

Further, there may be used the constitution wherein function forms each having different characteristic for the low density region or the high density region are combined, such as the constitution wherein the function form shown in FIG. 19 is used for the low density region and the function form shown in FIG. 22 is used for the high density region.

In the example mentioned above, reference value Sus 1 (median value Sus A) and reference value Sus 4 (median value Sus B) are established to be outside the signal range of an region of interest. However, there may also be used the constitution wherein the above-mentioned reference values Sus 1 and Sus 4 (>Sus 1) are established within the signal range of the region of interest, and the example of that constitution will be explained as follows.

Figure 25:
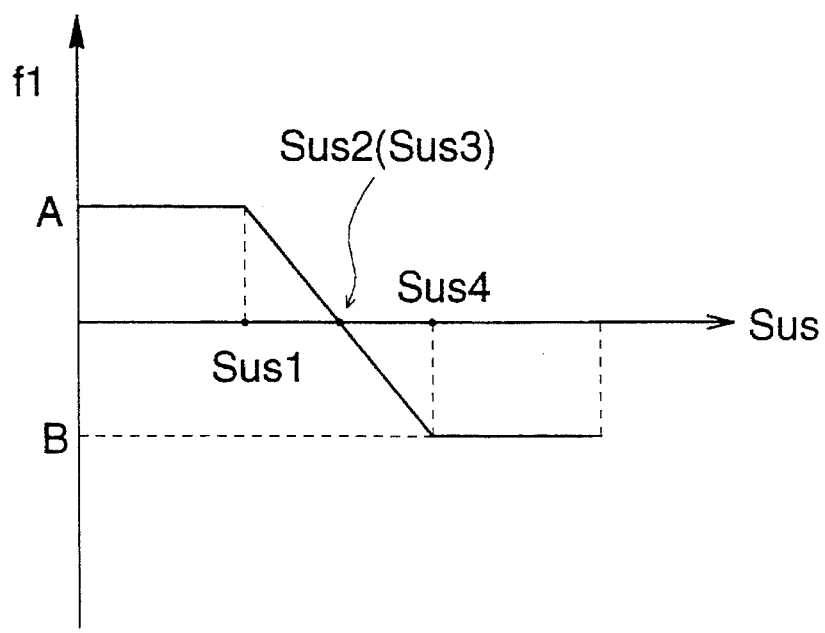
FIG. 25 is a diagram showing a function form of a correction value in an example.

In the example, the aforesaid correction f1 (Sus) takes the function form shown in FIG. 25 in the correction of original image signal Sorg based on the expression Sproc= Sorg+f1 (Sus).

The function form shown in FIG. 25 mentioned above are shown as follows in Expression 5 below.

Expression 5

$$f1(Sus) = \begin{cases} A & (Sus < Sus1) \\ \beta_1 (Sus2 - Sus) & (Sus1 \leq Sus < Sus2) \\ \beta_2 (Sus3 - Sus) & (Sus3 \leq Sus < Sus4) \\ B & (Sus \geq Sus4) \end{cases}$$

In correction f1 (Sus) with the aforesaid characteristics, reference unsharp mask signal Sus i (i=1–4) (Sus 2=Sus 3) which is a reference for correction value change is obtained through the following expression when the maximum signal value and the minimum signal value both in an region of interest of an original image are represented respectively by Smax and Smin.

$$Sus\ i = ki \cdot Smax + (1-ki) \cdot Smin$$

With regard to the aforementioned coefficient ki (i=1–4), it is arranged to have the example of k1=0.35, k2=k3=0.5 and k4=0.65. Further, it is arranged to have the example of coefficient of correction f1 (Sus) $\beta_1$, $\beta_2$=0.8.

With regard to the aforesaid coefficients k1, k2 (k3) and k4, in this case, it is arranged so that Sus 1, Sus 2 (Sus 3) and Sus 4 which are determined by the aforesaid coefficients are established inside the signal range of the region of interest.

Figure 26:
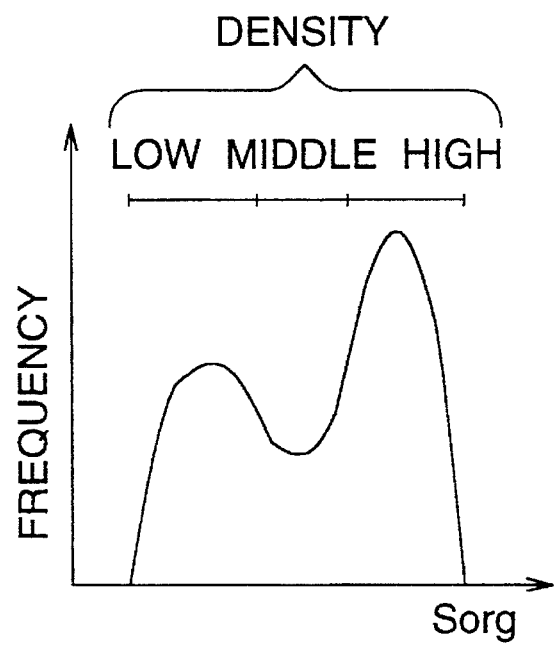
FIG. 26 is a diagram showing an example of histogram characteristics of an original image.
Figure 27:
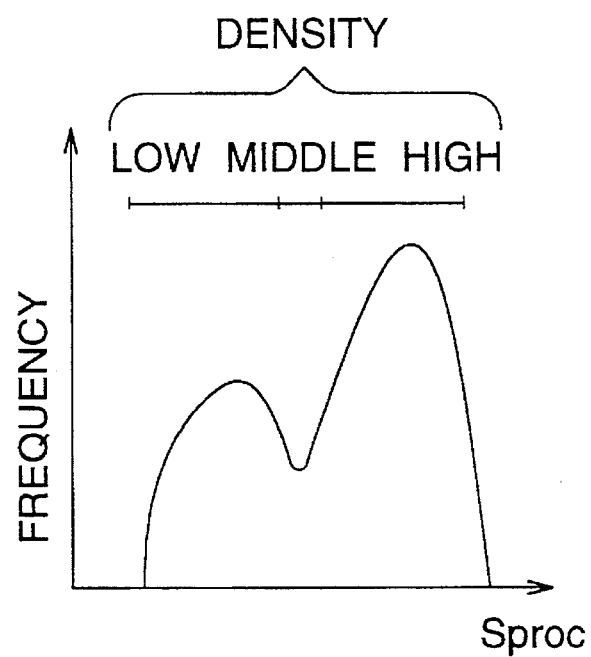
FIG. 27 is a diagram showing histogram characteristics of the image processed in an example.

When original image signal Sorg is corrected by the use of correction f1 (Sus) having the aforesaid characteristics, it is possible to compress the medium density region of original image signal Sorg having the characteristics shown in FIG. 26, for example, while maintaining the contrast of the low density region (portion having low signal values) and the high density region both of the original image signal Sorg (see FIG. 27), and thereby to compress the dynamic range totally.

incidentally, even in the constitution wherein reference value Sus 1 (median value Sus A) taking the positive maximum value and reference value Sus 4 (median value B) taking the negative minimum value are established inside the signal range of the region of interest as stated above, it is still possible to use various function forms shown in the aforesaid FIGS. 21–24.

Figure 28:
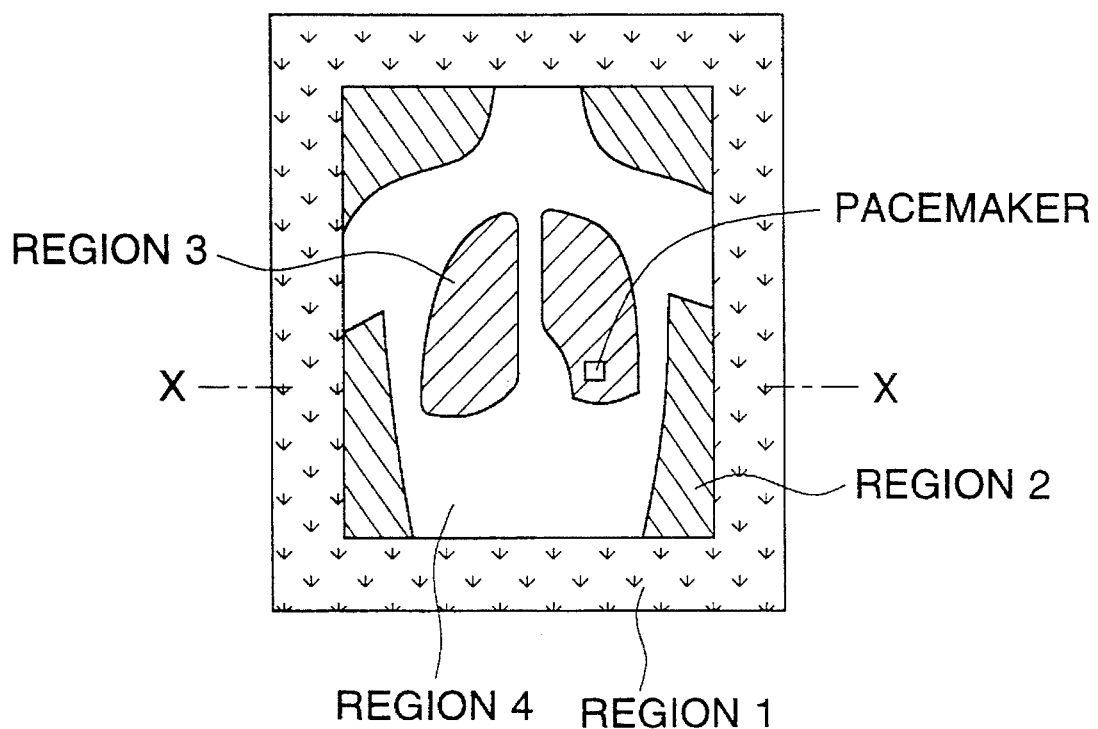
FIG. 28 is a diagram showing how each region is discriminated in a front view of a chest image.

When a pacemaker made of metal, for example, is located in the lung portion of a front view chest image as shown in FIG. 28, the signal value on the portion of the pacemaker is extremely lowered. Therefore, when correcting the side (low density region) where the signal value is low based on unsharp mask signal Sus, the pacemaker portion is forced to be subjected to correction for raising the signal value though the lung regions is required not to be corrected.

An example explained as follows, therefore, has the constitution wherein even when a foreign matter having extremely different signal values exists in an region that is required not to be compressed, it is possible to avoid that the region is corrected by unsharp mask signal Sus affected by that foreign matter.

First, in an original image (front view chest image) as shown in FIG. 28, an region is divided for using properly the correction characteristics. In the example shown in FIG. 28, the region is divided into 4 portions including a peripheral non-irradiation region (region 1), a directly exposed region (region 2), a lung regions (region 3) and other object regions (region 4).

The aforementioned division of an region can also be represented by the constitution wherein an original image is displayed on a CRT or the like and an operator inputs information for designating the region while observing the display on the CRT, or by the constitution wherein a contour of an object, a contour of a lung regions (internal structure) and a border of a non-irradiation region are extracted from original image signal Sorg through image signal analyses for automatic setting.

When obtaining image signal Sproc whose dynamic range is compressed by calculating Sproc=Sorg+F under the assumption that the correction function is represented by F, the compression is carried out by making the correction function F to be 0 (constant value function f2) in the regions 1, 2 and 3 and by using correction f1 (Sus) that is a function of unsharp mask signal Sus in the region 4 that is an region of interest excluding the lung regions.

The correction f1 (Sus) mentioned above is set to the function form shown in FIG. 29, and that function form is indicated in the following Expression 6.

Expression 6

$$f1\ (Sus) = \begin{cases} \beta_1\ (Sus1 - Sus) & (Sus < Sus1) \\ 0 & (Sus1 \leq Sus < Sus2) \\ \beta_2\ (Sus2 - Sus) & (Sus \geq Sus2) \end{cases}$$

Figure 30:
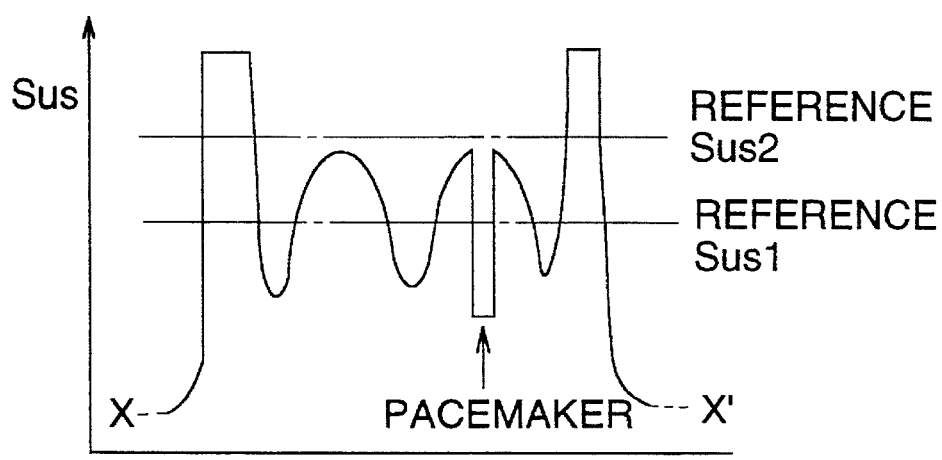
FIGS. 30 (a)–30 (c) are profile diagrams each for explaining an effect of establishing a correction function for each region.
Figure 30:
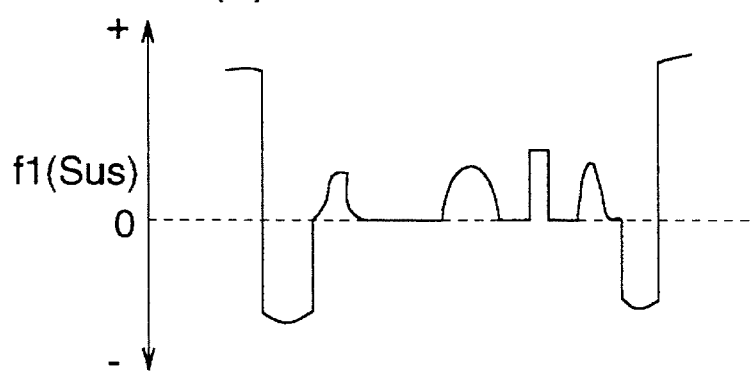
Figure 30:
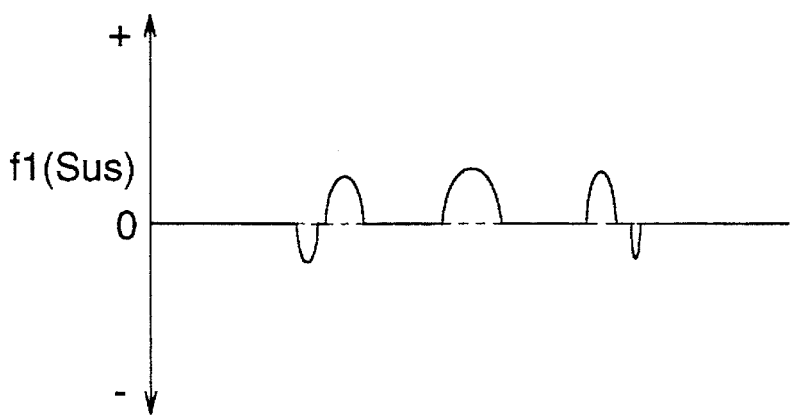

With regard to reference values Sus 1 and Sus 2 in the aforesaid correction f1 (Sus), the reference value Sus 2 is set to be lower than the directly exposed region and to be higher than a signal level on the lung portion in the profile of the portion crossing the lung regions (and pacemaker embedded in the lung regions) in unsharp mask signal Sus as shown in FIG. 30 (*a*), while, the reference value Sus 1 is set to be in the vicinity of the level of a border line separating the lung regions from other object regions.

Figure 29:
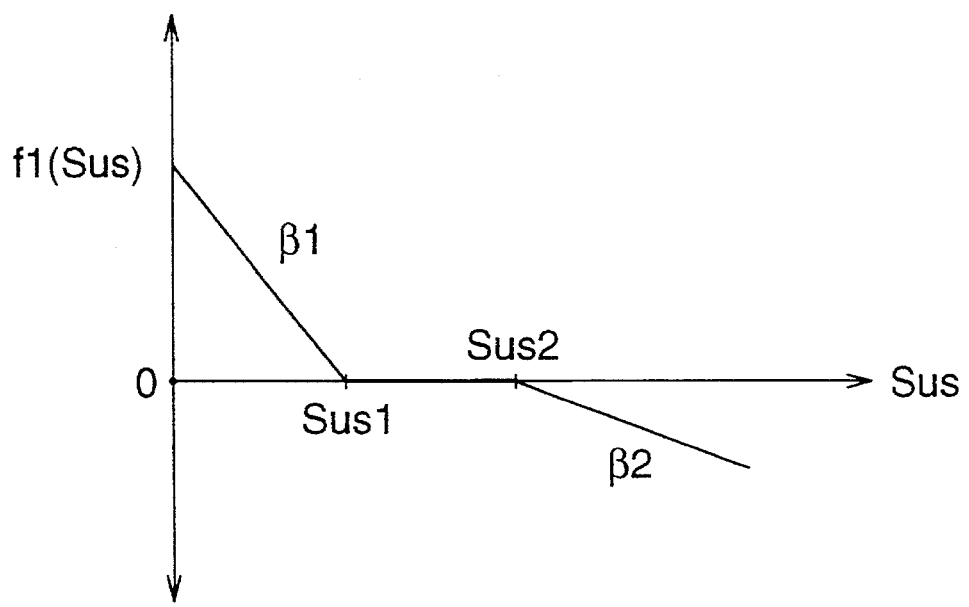
FIG. 29 is a diagram showing a function form of a correction value determined for each region.

In the foregoing, under the assumption that the correction f1 (Sus) having the characteristics shown in FIG. 29 is applied to all regions of an image based on a profile of the portion crossing the lung regions of unsharp mask signal Sus shown in FIG. 30 (*a*), a profile of the correction f1 (Sus) corresponding to the aforesaid profile of FIG. 30 (a) is established as shown in FIG. 30 (*b*).

Namely, when there is not pacemaker, a signal of the lung regions is confined within a signal range interposed between reference values Sus 1 and Sus 2, and no correction value is established (correction value=0). However, when there is a pacemaker, unsharp mask signal Sus is lower than the reference value Sus 1 at the portion of the pacemaker, and a correction value for raising the signal on the pacemaker portion is established. When the signal at the pacemaker portion is raised, a signal difference between the lung regions and the pacemaker portion is narrowed, and the pacemaker portion becomes unsuitable for image-reading.

In the example mentioned above, however, the lung regions is designated to be out of the region for correction from the beginning. Therefore, even if the high unsharp mask signal Sus is established on the pacemaker portion, it does not happen that signals for the pacemaker portion are corrected based on the high unsharp mask signal, thereby it is possible to keep the signal difference between the pacemaker portion and the lung regions.

Namely, among correction values f1 (Sus) shown in FIG. 30(*b*), there is established the correction value f1 (Sus) shown in FIG. 30(*c*) wherein portions corresponding to regions 1, 2 and 3 are zero. Therefore, even when large unsharp mask signal Sus is calculated being affected by a pacemaker, it does not happen that the correction is made based on that large unsharp mask signal.

Further, directly exposed regions and non-irradiation regions are designated not to be corrected. Therefore, it is possible to avoid that the directly exposed region and the non-irradiation region are corrected to be close to the signal value of a human body region. Thus, it is possible to provide an image having an excellent diagnostic power keeping the signal difference between the non-object/non-irradiation regions and a human body region.

Incidentally, it is also acceptable that in region 1 that is the aforesaid non-irradiation region, the aforesaid correction function F is made to be a constant function taking an extremely large value, and thereby the non-irradiation region is made to have the signal value mostly the same as that of the directly exposed region so that the non-irradiation region and the directly exposed region may be displayed almost uniformly at high density when also the non-irradiation region is displayed, and the human body portion may be contrasted.

It is also possible to used the constitution wherein when designating regions for using the correction characteristics properly, data including reference values Sus 1 and Sus 2 determining correction characteristics by correction value f1 (Sus) and coefficients $\beta_1$ and $\beta_2$, or the constitution wherein constant correction value (constant value function f2) given to the region where no correction value f1 (Sus) is used is inputted variably. It is further possible to use the constitution wherein processed image signal Sproc obtained based on the results of inputting the aforesaid correction data is displayed.

In the example mentioned above, a mask size or a frequency characteristic of an unsharp mask is an important parameter that affects diagnosing faculties of an image.

In the dynamic range compression processing, only ultra low frequency components corresponding to the change in the rough structure of an object (smooth signal difference of a lung regions or a mediastinum region) are extracted as unsharp mask signal Sus, and correction f1 (Sus) is established based on the Sus. Thus, it is possible to compress the total density range while maintaining the change in fine fabrics (bones and blood vessels).

When a mask size is small, not only ultra low frequency components corresponding to rough change in an object but also frequency components corresponding to the change in fine fabrics are contained in unsharp mask signal Sus, thus, the change in fine fabrics is erased by adding the correction value based on the unsharp mask signal Sus, and contrasts on bones and blood vessels are lowered.

When a mask size is large, on the other hand, a sharp edge of an unsharp image at the portion where signal values change sharply is worsened, and undesirable compression is carried out in the vicinity of a border line between an region where compression is desired and an region where compression is not desired. Further, when a mask size is excessively large, even frequency components corresponding to the rough change in an object are lost (a flat image in an extreme case). Therefore, effects of dynamic compression can not be obtained even when a correction value based on unsharp mask signal Sus is added.

After the inventors of the invention studied from the aforementioned viewpoints, they found that a mask size ranging from 10 mm to 60 mm in terms of a length on a life size image is preferable, that ranging from 15 mm to 30 mm is more preferable and that ranging from 20 mm to 30 mm is the most preferable.

When the mask size is smaller than 10 mm, frequency components corresponding to the change in fine fabrics increase sharply. Therefore, if a correction value is established based on the unsharp mask signal Sus obtained with that mask size, diagnosing faculties are lowered remarkably. In a chest image and an abdomen image, in particular, when a mask size is 15 mm or more, Sus does not have frequency components corresponding to thick blood vessels such as aortas. and when it is 20 mm or more, Sus does not contain frequency components with which the contrast is not desired to be lowered though the relatively low frequency corresponding to a rib is contained. Therefore, an image having high diagnosing faculties can be obtained.

In this case, a mask size represents a simple mean value of the length of a short side and that of a long side for a rectangle, the length of one side for a square, a diameter for a circle and a simple mean value of the major axis and the minor axis for an ellipse.

Further, when describing with a frequency characteristic owned by an unsharp mask in place of a mask size, it is preferable that the frequency characteristic is not less than 0.5 and not more than 0.5 respectively when the modulation transfer function of the unsharp mask is 0.01 cycle/mm and 0.06 cycle/mm, and it is more preferable that the frequency characteristic is not less than 0.5 and not more than 0.5 respectively when the modulation transfer function of the unsharp mask is 0.02 cycle/mm and 0.04 cycle/mm, and it is further preferable that the frequency characteristic is not less than 0.5 and not more than 0.5 respectively when the modulation transfer function of the unsharp mask is 0.02 cycle/mm and 0.03 cycle/mm.

Further, in the invention, it is preferable that the maximum value of the absolute value of correction value f1 (Sus) that is a function of unsharp mask signal Sus is from ⅛ to ½ of the dynamic range in an region of interest of an object. For example, when the dynamic range of an region of interest of an object shows the two-digit value, it is preferable that the maximum value of the absolute value of the compression correction amount is ¼-digit to 1-digit.

When correction f1 (Sus) is expressed by a linear function of unsharp mask signal Sus like β (Sus 1–Sus), the preferable range of β representing the gradient and determining the compression degree is from 0.2 to 1.0, and more preferable one is from 0.4 to 0.8.

When the correction amount is too small, effects of dynamic compression are not exhibited, while, when the correction amount is too large, the relation of density levels on each region of an original image is reversed (for example, an average density of a mediastinum region becomes higher than that of a lung regions), resulting in an image which is too poor for diagnosis. For example, the problem of this kind takes place when the aforementioned linear function represented by β is set to be larger than 1.

FIG. 2 is a diagram showing an example of the aforementioned correction f1 (Sus), wherein the correction value f1 (Sus) shows characteristics that it is zero in an region where the value of Sus is smaller than Sus 1, while it decreases at a constant rate toward the minus side as the unsharp mask signal Sus increases. These characteristics are shown by the following expressions.

$$f1\ (Sus) = \beta\ (Sus\ 1 - Sus) \quad (Sus \geq Sus\ 1)$$
$$= 0 \quad (Sus < Sus\ 1)$$

Since an increase of image signal Sorg results in an increase of density in the present example, when the aforesaid correction f1 (Sus) is added to original image signal Sorg, the high density region is lowered and compressed.

Owing to the constitution mentioned above, a dynamic range of an region with high average density is compressed by unsharp mask signal Sus. It is therefore possible to obtain an image wherein the contrast of a microscopic structure thereof remains unchanged and a high density portion thereof is compressed.

Incidentally, in the constitution of the present example, when obtaining unsharp mask signal Sus of each pixel, central value (median value in the narrow sense) among signal values of a pixel in a mask region is used.

When the number of target pixels in the mask region is represented by N, and signal values of pixels in quantity of N are placed in the order wherein the smallest (largest) one comes first, the median value is defined to point the value which is (N×A%)th from the smallest (largest) value. In a broad sense, A can take an arbitrary value of 0–100 determined in advance, while in a narrow sense, A is 50% and takes a value which is called the so-called median value. In the present example, the median value (central value) in that narrow sense is used.

In the invention, however, the median value is assumed to be one in the broad sense mentioned above, and it is preferable that A is established within a range of 40–60 and the most preferable is A in a narrow sense that is 50, though there is no limitation to A=50%.

When the aforesaid median value is used in image processing actually, it is possible to used a method wherein the accumulated number of times of signal values in the mask region is obtained and the signal value whose accumulated number of times exceeds {N×A%} first is defined to be a median value. When {N×A%} is not an integer, it is arranged to be an integer through general methods such as rounding off, cutting away or raising to a unit.

Next, an effect brought about through the use of a median value will be explained by comparing an occasion wherein dynamic range compression processing in which unsharp mask signal Sus is obtained from the median value (central value) in a narrow sense mentioned above is applied for the compression of a low density region in a chest image and for the compression of a high density region in a lower limb image (see FIGS. 32 and 33) with an occasion wherein unsharp mask signal is obtained from the simple mean value of signal values in the mask region.

In dynamic range compression shown in FIGS. 32 and 33, every original image signal Sorg employed a digitized one with sampling pitch of 175 μm, 2048 horizontal pixels and 2464 vertical pixels, and a shape of every unsharp mask region was rectangular, and a mask size was represented by 127 pixels for the chest and 63 pixels for the lower limb.

In FIGS. 32(a), 32(b), 32(c), 32(d) and 32(e) and 33(a), 33(b), 33(c), 33(d) and 33(e), all of original image signal Sorg, unsharp mask signal Sus, correction value f1 (Sus) and processed image signal Sproc are assumed to indicate a profile taken on line X—X' in each of the radiographing regions.

Figure 31:
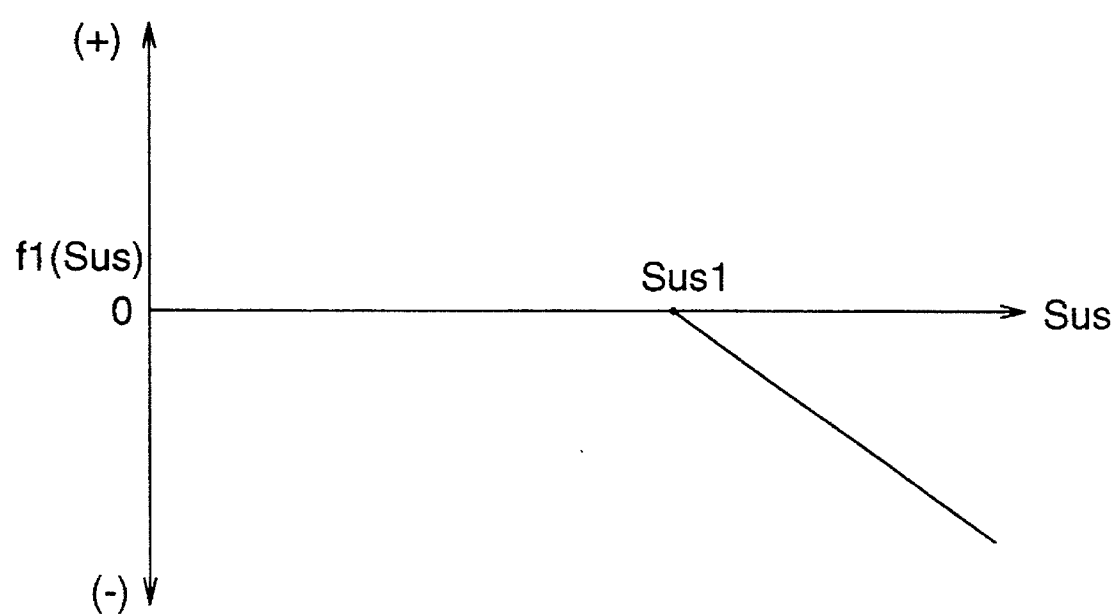
FIG. 31 is a diagram showing an example of a function form of a correction value for compression of a high density region.
Figure 32A:
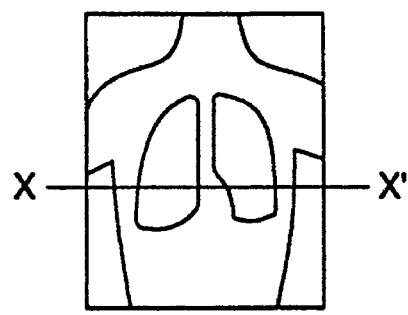
FIGS. 32(a)–32(e) represent diagrams showing how a chest image is subjected to compression processing.
Figure 32B:
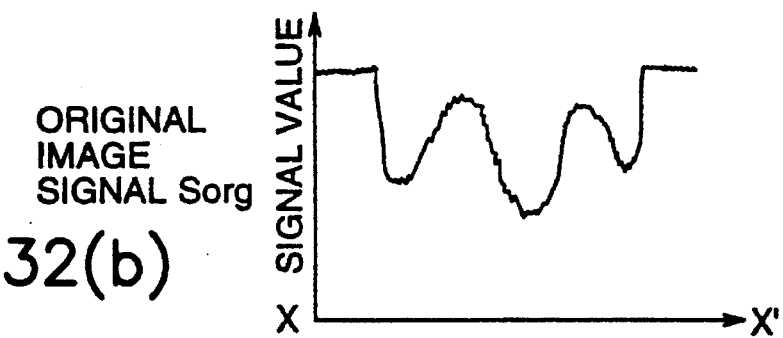
Figure 32C:
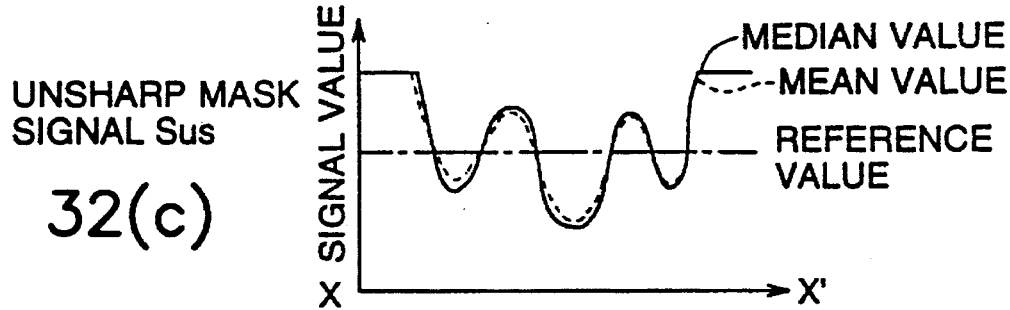
Figure 32D:
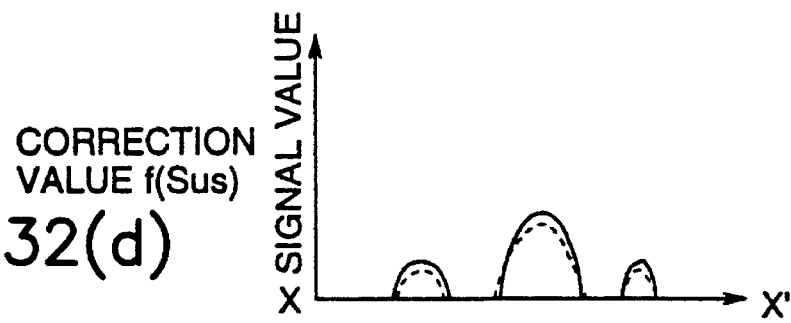
Figure 32E:
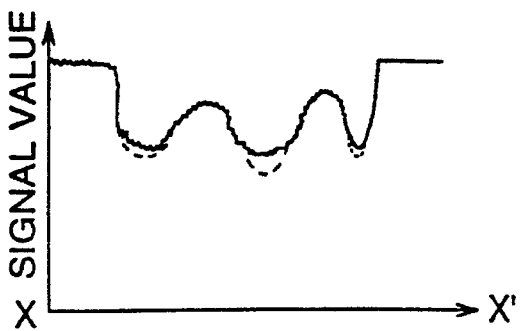
Figure 33A:
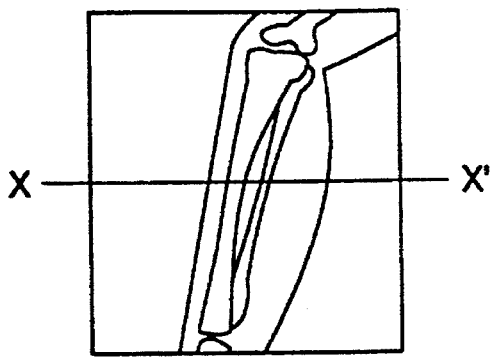
FIGS. 33(a)–33(e) represent diagrams showing how an image of a lower limb is subjected to compression processing.
Figure 33B:
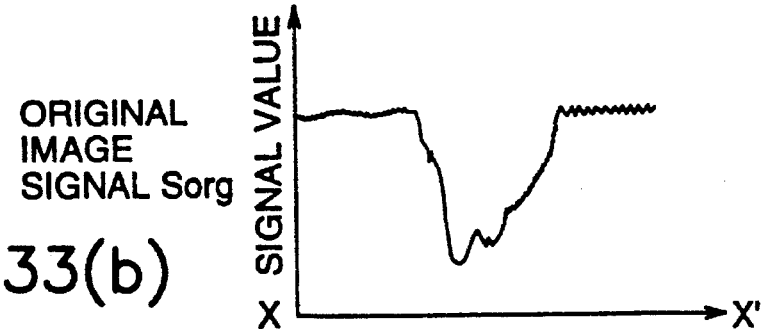
Figure 33C:
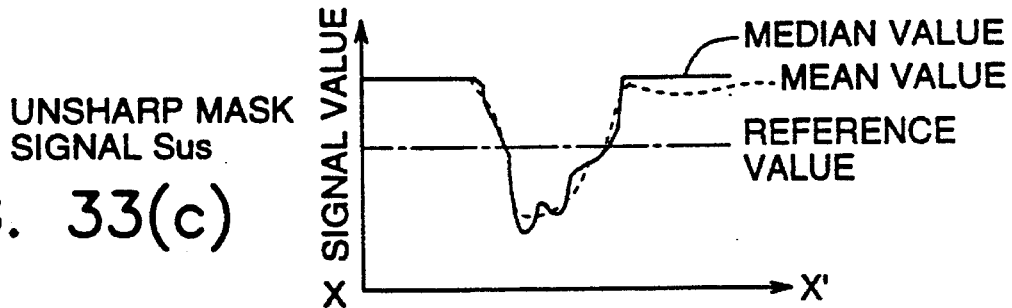
Figure 33D:
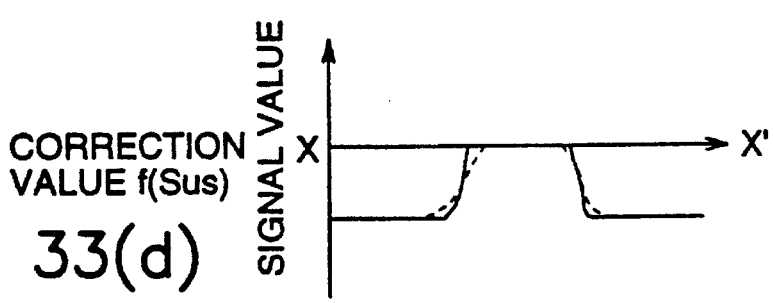
Figure 33E:
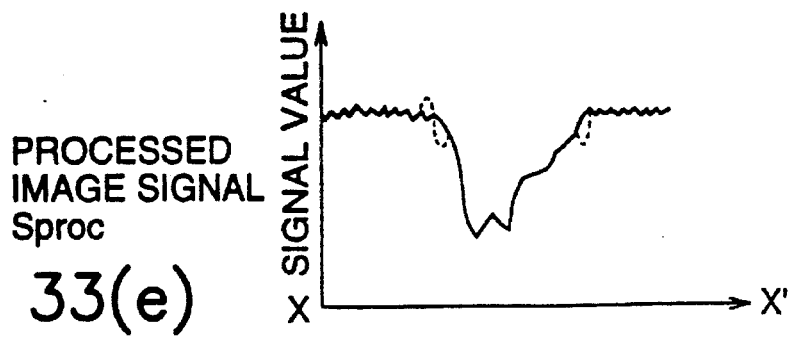
Figure 34:
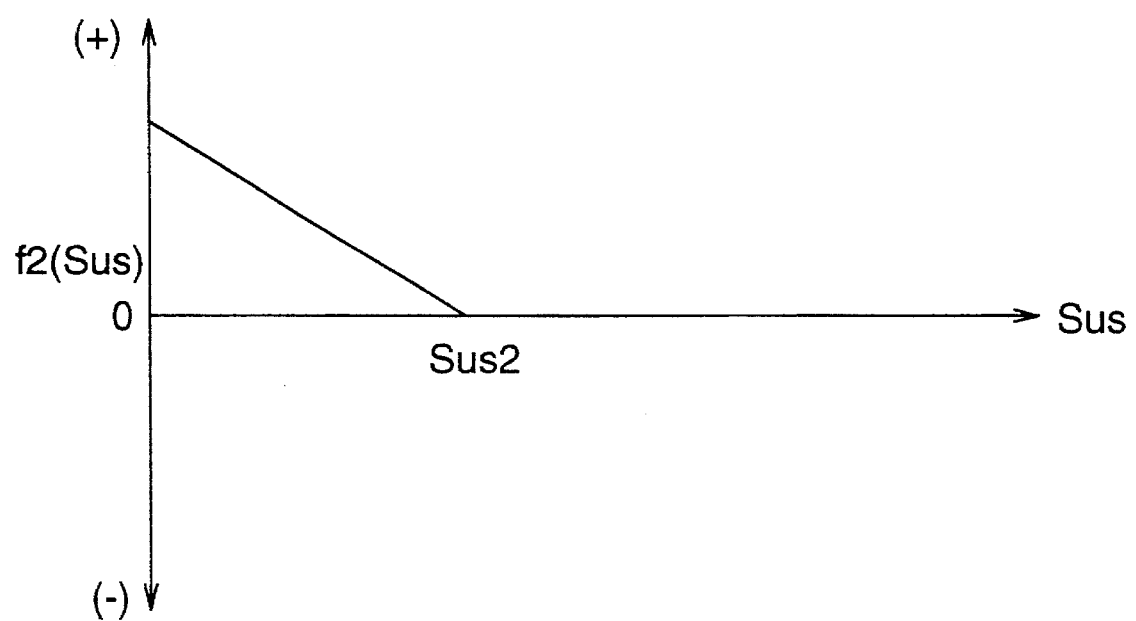
FIG. 34 is a diagram showing an example of a function form of a correction value for compression of a low density region.
Figure 35:
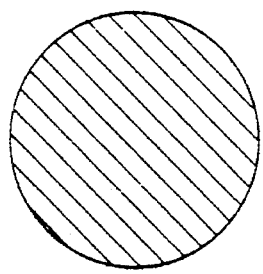
FIGS. 35 (a)–35 (i) are diagrams each showing an example of a type of a mask shape.
Figure 35:
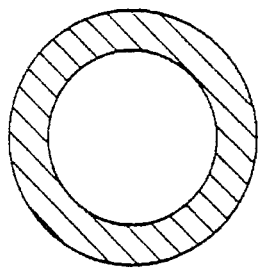
Figure 35:
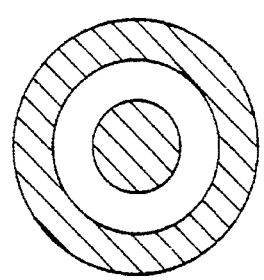
Figure 35:
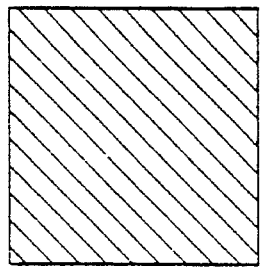
Figure 35:
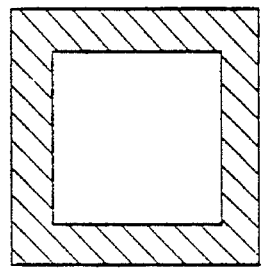
Figure 35:
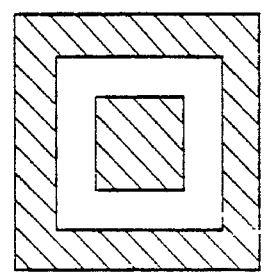
Figure 35:
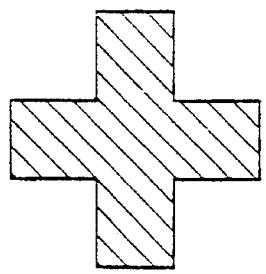
Figure 35:
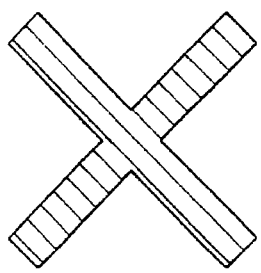
Figure 35:
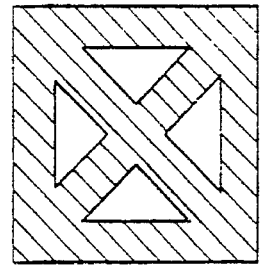

Further, correction value f1 (Sus) of the function form shown in FIG. 31 was used for compression of a high density region in a lower limb image and correction value f2 (Sus) of the function form shown in FIG. 34 was used for compression of a low density region in the chest image, thus processed image signal Sproc was obtained in the both occasions above through calculation of Sproc=Sorg+f(Sus).

As Apparent from the aforementioned FIGS. 32(a), 32(b), 32(c), 32(d) and 32(e) and 33(a), 33(b), 33(c), 33(d) and 33(e), with regard to unsharp mask signal Sus wherein a median value is used, the change in the fine structure is smoothed and rough change of signal values (change of a lung regions and mediastinum in the chest, change of bone region and soft region in the lower limb, and change of skin and directly exposed regions in the both images) reproduces the change of original image Sorg in a high fidelity.

On the other hand, when unsharp mask signal Sus is obtained from a simple mean value (shown with dotted lines in FIGS. 32(a), 32(b), 32(c), 32(d) and 32(e) and 33(a), 33(b), 33(c), 33(d) and 33(e)), an profile of a portion where signals change sharply is more dull compared with that in the case wherein a median value is used.

As a result of obtaining processed image signal Sproc by adding a correction value obtained based on the aforementioned unsharp mask signal Sus to original image signal Sorg, when a simple mean value is used for the chest image, a faint artifact which can be observed by a radiographer or a doctor was caused in the vicinity of a border line between a lung regions and mediastinum, while in processing wherein a median value was used also for the chest image, the artifact was hardly observed even when those skilled in radiation images such as radiologists or doctors observed carefully.

On the other hand, in the case of a simple mean value in the lower limb image, intensive artifacts capable of being discriminated easily by those other than a radiographer or a doctor skilled in radiation images were caused in the vicinity of a border between skins and directly exposed regions. However, in the case of using a median value, it was possible to reduce the artifact to the level at which those skilled in radiation images such as radiographers or doctors can manage to discriminate when they observe carefully.

When compressing a dynamic range of a high density region of an image including a directly exposed region, intensive artifacts tend to be cause because of an extremely great change of signals on the border between a skin (object) and a directly exposed region, which makes dynamic range compression processing wherein unsharp mask signal Sus is represented by a median value to be effective.

As an object wherein it is preferable to compress a dynamic range of an region close to a directly exposed region and relatively high in density while leaving a low density region as it is, there may be given upper limbs and breasts in addition to the lower limbs. In these objects, dynamic range compression processing wherein unsharp mask signal Sus is represented by a median value exhibits a remarkable effect.

In radiation images wherein compression of a high density region including a directly exposed region is required, unsharp mask signal Sus can show a sharp edge when unsharp mask signal Sus is represented by a median value in a mask region, and it is possible to carry out dynamic range compression accompanied by no occurrence of artifacts even in an region where original image signal Sorg changes sharply.

Incidentally, unsharp mask types (mask shapes and types of smoothing calculation) and mask sizes are determined based on no information of an objet. However, it is preferable that unsharp mask types and mask sizes are changed based on object information.

As the aforesaid object information, there may be given information of radiographing regions and ages included in incidental information stored together with image signals, and information of a size of an object, a shape thereof and frequency components contained which are obtained by analyzing image signals. Incidentally, with regard to information of radiographing regions, that information may be inputted by an operator each time or the radiographing region of an object may be recognized automatically through analyses of images.

The unsharp mask types mentioned above simple mean that mask shapes (see FIGS. 35(a)–35(i)) and methods of calculating unsharp mask signal Sus (simple mean, weighted simple mean, median and mode are changed. Incidentally, in calculation of unsharp mask signal Sus, it is possible either to use signal values of all pixels in an mask region or to use a part of pixels in the mask region by sampling at constant intervals.

Figure 36:
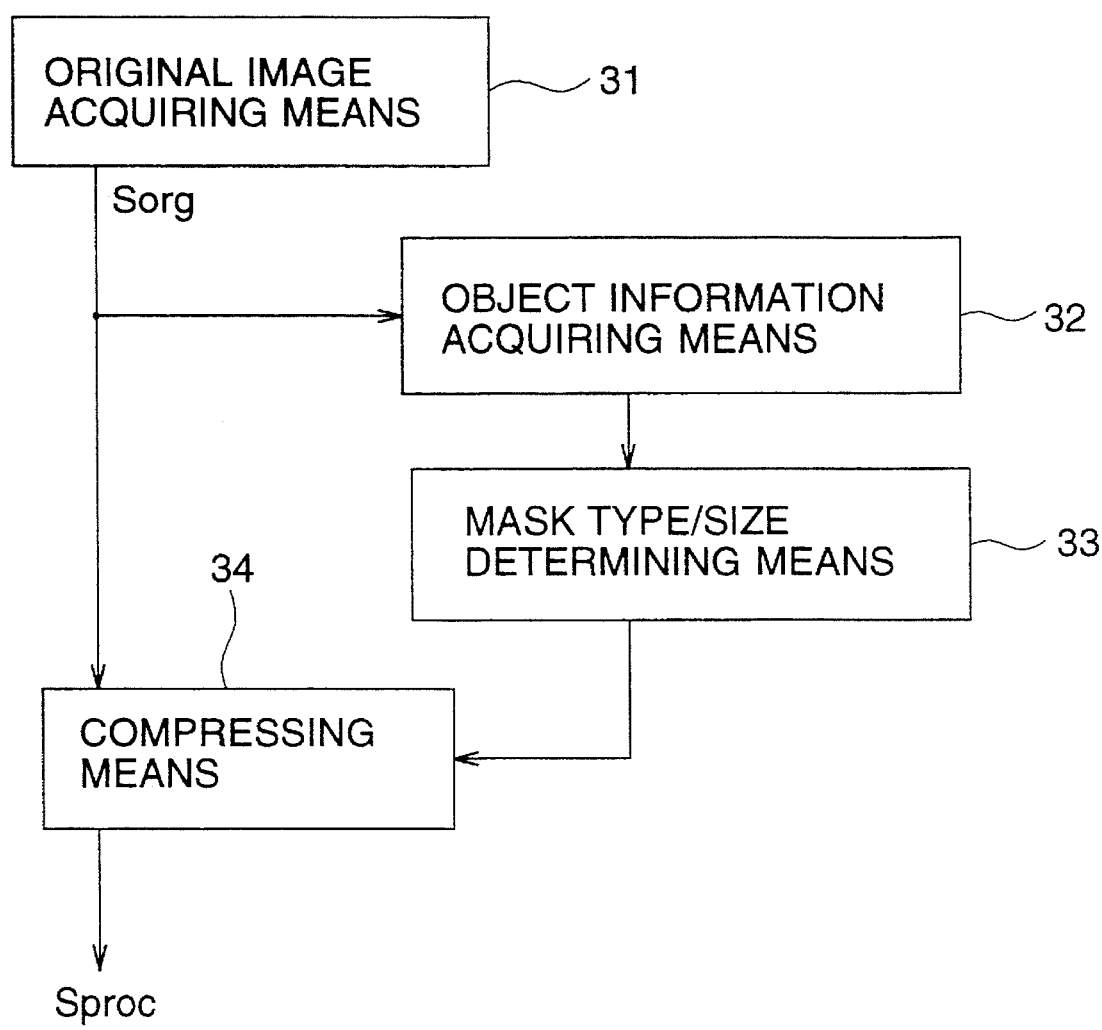
FIG. 36 is a system block diagram of an example of compression processing conducted in accordance with information of an object.

FIG. 36 is a block diagram showing the constitution of a system in another example wherein unsharp mask types and mask sizes both in dynamic compression processing are changed based on object information.

In FIG. 36, original image signals Sorg obtained by original image reading simple means 31 such as record reading unit 3 shown in FIG. 1 are read into object information acquiring simple means 32.

In the object information acquiring simple means 32, information of frequency components are obtained through Fourier transform of the original image signal Sorg, for example, or radiographing regions, object sizes and shapes are obtained through image analyses of the original image signal Sorg, or information of radiographing regions are acquired separately.

In mask type/mask size determining simple means 33, mask types (method of calculation of unsharp mask signal) and mask sizes are determined based on various object information (radiographing regions and frequency components etc.) obtained by the aforementioned object information acquiring simple means 32, and information of the determined mask types and mask sizes are outputted to compressing simple means 34.

Here, examples of how concrete mask types and mask sizes are determined will be shown below, referring to Table 1.

For example, when radiographing regions include three types, the chest, the legs and arms and breast, in the method of smoothing calculation as a type of an unsharp mask, a simple mean value, a weighted simple mean and a median value are selected respectively for the chest image, the legs and arms and the breast.

It is further preferable to arrange the constitution wherein a standard mask size is determined in advance for each radiographing region, and then the standard mask size is changed from the standard size based on the results of analyses of frequency components, so that the mask size within a predetermined range is made smaller when the rate of high frequency components contained in image signals is greater.

TABLE 1

| Radiographing regions | Mask types | Stand sizes | Range of size change |
|---|---|---|---|
| Chest | Simple mean | 127 | ±20% |
| The legs and arms | Weighted simple mean | 31 | ±20% |
| Breast | Median | 21 | ±15% |

Figure 37:
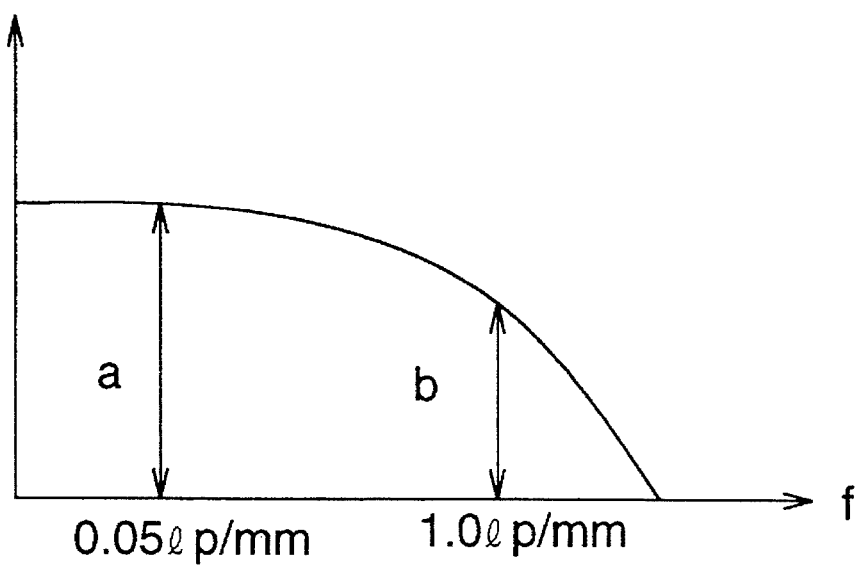
FIG. 37 is a diagram showing how a frequency is analyzed.
Figure 38:
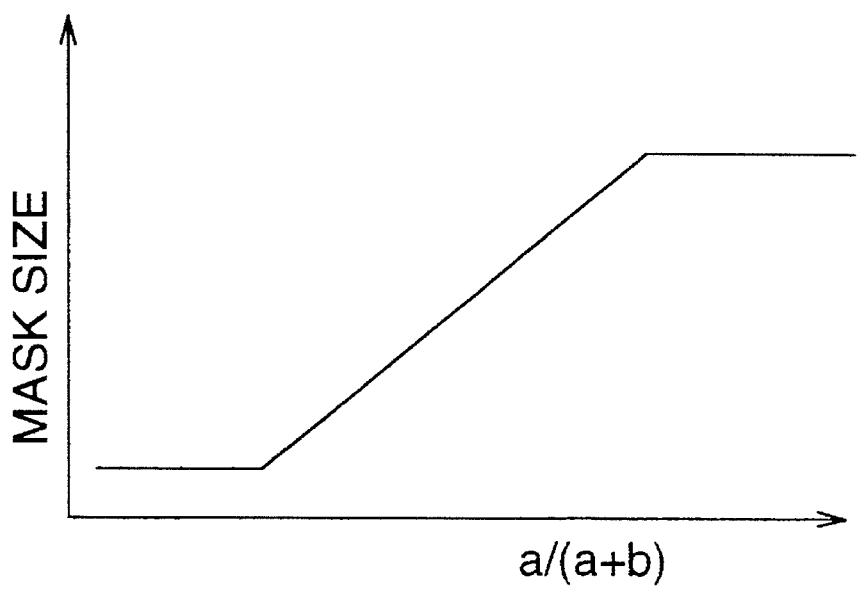
FIG. 38 is a diagram showing how a mask size corresponding to the results of frequency analyses is determined.

For making the results of analyses of frequency components to be reflected on the change of mask sizes, intensity a and intensity b of two predetermined frequencies at a low frequency side and a high frequency side established in advance based on the results of frequency analyses as shown in FIG. 37, for example, and a map in which mask sizes are stored in accordance with the value of a/(a+b) as shown in FIG. 38 is prepared so that the greater mask size may be established when the rate of low frequency components is greater and a/(a+b) is greater accordingly.

In the foregoing, types of smoothing calculation are switched to three types including a simple mean, a weighted simple means and a median, as a mask type. In addition to this, the shape of a mask region can also be selected by information of radiographing regions or the like from a plurality of shapes established in advance (see FIGS. 35(a)–35(i)).

Figure 39:
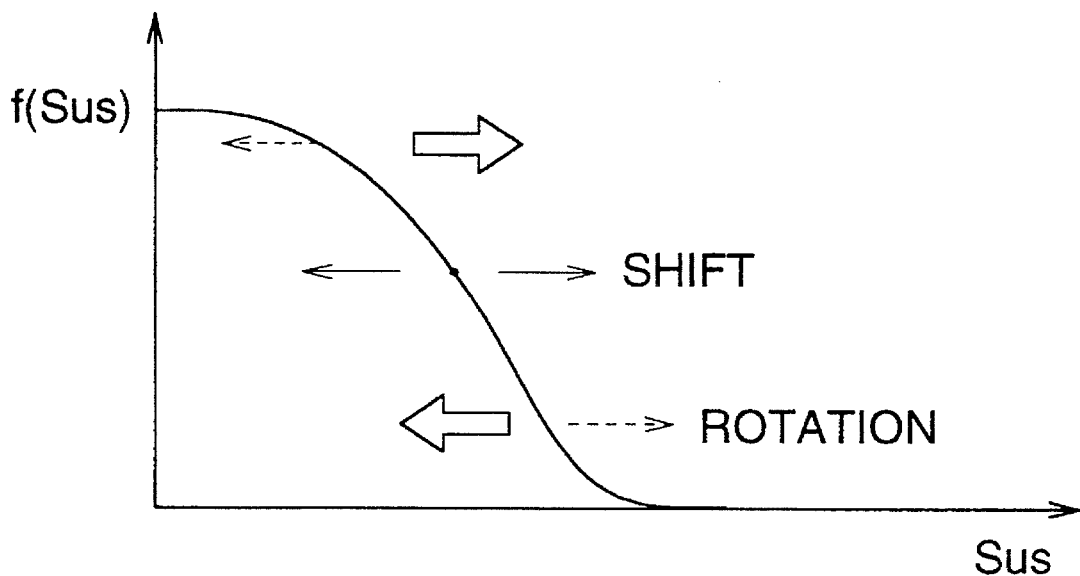
FIG. 39 is a diagram showing how a correction value table is prepared.

Further, it is preferable that a standard table (standard function form) of correction value f(Sus) is prepared, an amount of characteristic features is extracted for each image, and a correction table optimum for each image is prepared through shift or rotation (see FIG. 39) based on the aforementioned extracted amount. Owing to the correction table prepared, calculation time for compression processing can be shortened because it is not necessary to calculate for each pixel.

In the constitution wherein a correction value is obtained through rotation or shift made for the standard table in accordance with an amount of characteristic features of an image, even a complicated function form which can not be shown with a simple expression can be prepared for each image.

When a linear function as shown in FIG. 31 or FIG. 34 is set as a function form, a portion where a differential coefficient is discontinuous is caused, and this sometimes causes occurrence of artifacts. Therefore, it is preferable that the differential coefficient is continuous and that a polynomial expression, especially a secondary function is used.

Incidentally, unsharp mask types and mask sizes are changed for each image based on object information in the above example. However, frequency components contained in an region are different even on the same image. If therefore unsharp mask types and mask sizes are changed for each region in the same image, it is possible to realize the dynamic range compressing processing which is further appropriate.

Figure 40:
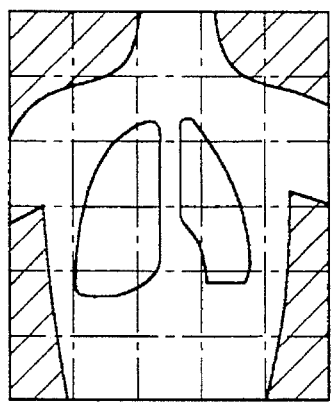
FIG. 40 is a diagram showing how each region is discriminated in a chest image.

For example, let it be assumed that the chest image as shown in FIG. 40 is subjected to dynamic range compression of a low density region through the operation expressions of $$Sproc = Sorg + f3 \ (Sus)$$

$$f3 \ (Sus) = \beta \ (A - Sus) \quad (Sus \leq A)$$
$$= 0 \quad (Sus > A)$$

and the mask shape for obtaining unsharp mask signal Sus is a rectangle and a simple mean value is used for the smoothing operation.

Now, the chest image is divided into a plurality of regions in a grid form first and frequency components for each region are obtained through two-dimensional Fourier transform. Then, from the rate of high frequency components (low frequency components) of each region, a mask size for each region is established to be greater when the rate of low frequency components of the region is greater.

In the aforementioned analyses of frequency components, a mask size for the portion where signals change sharply (a border between the skin and a directly exposed region) is established to be smaller because the rate of high frequency components is greater, thus occurrence of artifacts caused by compression processing is restrained on the aforesaid portion where signals change sharply (a border between a directly exposed region and the skin).

Figure 41:
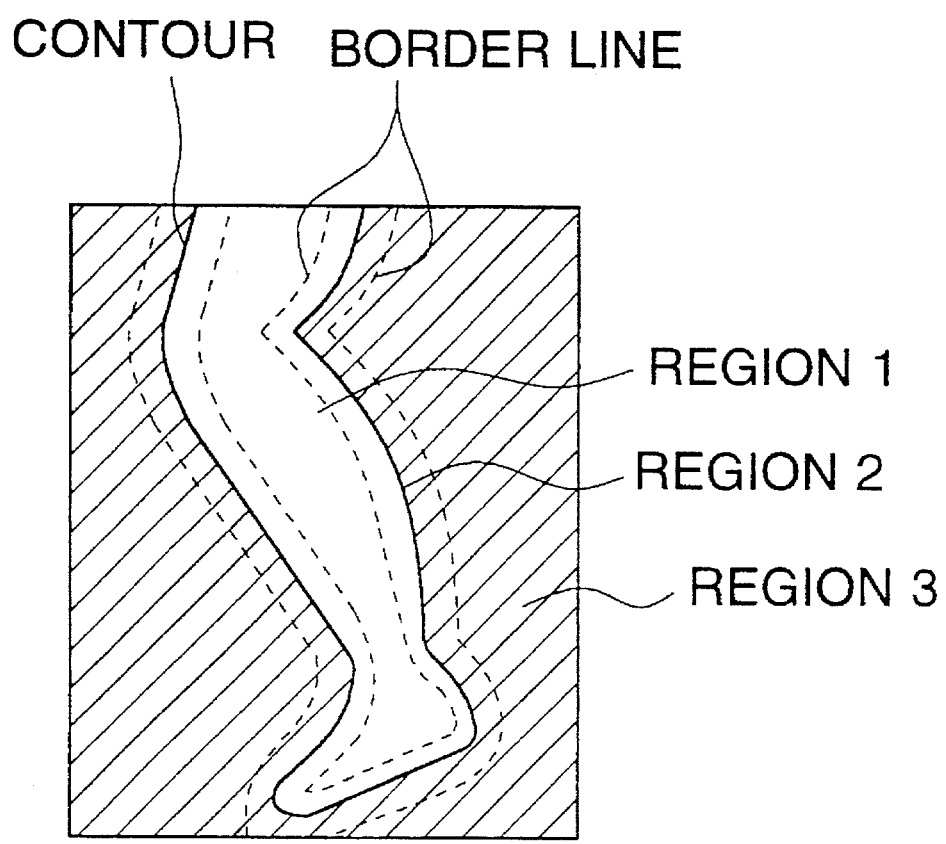
FIG. 41 is a diagram showing how each region is discriminated in an image of lower limbs.

Next, there will be explained an example wherein in the lower limb image as shown in FIG. 41, an region is divided based on contour extraction, and a mask type and a mask size are established for each divided region.

Let it be assumed that dynamic range compression of a high density region is carried out in the lower limb image through the following operation expression.

$$Sproc = Sorg + f1 \ (Sus)$$

$$f1 \ (Sus) = \beta \ (Sus \ 1 - Sus) \quad (Sus \geq Sus \ 1)$$
$$= 0 \quad (Sus < Sus \ 1)$$

Incidentally, the aforesaid correction value f1 takes the function form shown in FIG. 31.

In the lower limb image, a contour of an object was extracted first through image analyses of original image signals, and border lines (dotted lines in FIG. 41) located at a certain distance from the contour both inside and outside the contour were set.

A region surrounded by the border line inside the contour was named region 1, a region including the contour surrounded by two border lines was named region 2, and a region outside the outer border line that is outside the contour (directly exposed region) was named region 3, and mask types and mask sizes for the regions 1, 2 and 3 were set as shown in Table 2.

TABLE 2

| Regions | 1 | 2 | 3 |
|---|---|---|---|
| Mask types | | | |
| Mask forms | Rectangle | Rectangle | Rectangle |
| Smoothing operation | Simple mean value | Median | Simple mean value |
| Mask sizes | 31 | 31 | 15 |

In the region 2 including a border between the skin and a non-object portion, it is possible to restrain occurrence of artifacts on a border between the skin where signals change sharply and a directly exposed region by using a median value in smoothing operation in a mask region. In the region 1 that is an object region including no border between the directly exposed region and the skin, it is possible to shorten operation time without deteriorating image quality by using a simple mean value that is shorter than a median value in terms of operation time. Further, in the region 3 that is a non-object portion, variation of signals is only for noise components with relatively high frequency. Therefore, even when the mask size is smaller than that in the region 1, image quality is not affected, and operation time can further be shortened due to the reduction of mask sizes.

Incidentally, in the chest image, it is also possible to take the constitution wherein a region is divided based on contour extraction similarly to the aforesaid lower limb image, and mask types and mask sizes are determined for each region, which does not limit the radiographing regions and is effective, in particular, for compression of the high density region side of lower limb images or the like where dynamic range compression of a high density region is required.

What is claimed is:

1. A dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

obtaining an unsharp mask signal Sus corresponding to said original image signal Sorg;

detecting an information of said object;

determining a correction value f1 (Sus) which is a function that decreases as said unsharp mask signal Sus increases in accordance with said information of said object; and conducting an operation based on an equation:

Sproc=Sorg+f1 (Sus)

2. The dynamic range compression method of claim 1, wherein said step of obtaining information of said object comprises obtaining a dynamic range information of said object.

3. The dynamic range compression method of claim 2, wherein said determining step determines said correction value f1 (Sus) to satisfy the following equation:

f1 (Sus)=$\beta$ (Sus1−Sus), when Sus<Sus1; and f1 (Sus)=0, when Sus1≦Sus where $\beta$ represents a coefficient, and Sus1 represents a reference value.

4. The dynamic range compression method of claim 3, wherein said determining step determines at least one of said coefficient $\beta$ and said reference value Sus1.

5. The dynamic range compression method of claim 2, wherein said determining step determines said correction value F1 (Sus) to satisfy the following equation:

f1 (Sus)=$\beta$1 (Sus1−Sus) when Sus≦Sus1 f1 (Sus)=0 when Sus1<Sus≦Sus2; and f1 (Sus)=$\beta$2 (Sus2−Sus) when Sus2<Sus where $\beta$1 and $\beta$2 represent coefficients, and Sus1 and Sus2 represent reference values.

6. The dynamic range compression method of claim 5, wherein said determining step determines at least one of said coefficients $\beta$1 and $\beta$2.

7. The dynamic range compression method of claim 5, wherein said determining step determines at least one of said reference values Sus1 and Sus2.

8. The dynamic range compression method of claim 5, wherein said determining step determines said correction value f1 (Sus) to satisfy the following equation:

f1 (Sus)=0 when Sus<Sus1 f1 (Sus)=$\beta$(Sus1−Sus)$^2$ when Sus1≦Sus where $\beta$ represents a coefficient, and Sus1 represents a reference value.

9. The dynamic range compression method of claim 8, wherein at least one of said coefficient B and said reference value Sus1 is determined in said determining step.

10. The dynamic range compression method of claim 2, wherein said determining step determines said correction value f1 (Sus) to satisfy the following equation:

f1 (Sus)=$\beta$ (Sus1−Sus) when Sus1<Sus f1 (Sus)=0 when Sus ≦Sus1 where $\beta$ represents a coefficient, and Sus1 represents a reference value.

11. The dynamic range compression method of claim 10, wherein said determining step determines at least one of said coefficient $\beta$ and said reference value Sus1.

12. The dynamic range compression method of claim 2, wherein said determining step determines said correction value f1 (Sus) to decrease monotonically.

13. The dynamic range compression method of claim 2, wherein said determining step determines a compression rate.

14. The dynamic range compression method of claim 2, wherein said determining step determines a compression region.

15. The dynamic range compression method of claim 2, wherein said determining step determines a reduction rate of said correction value f1 (Sus) which increases as said unsharp mask signal Sus increases.

16. The dynamic range compression method of claim 15, wherein said determining step determines a compression rate.

17. The dynamic range compression method of claim 15, wherein said determining step determines a compression region.

18. The dynamic range compression method of claim 2, wherein said determining step determines a reduction rate of said correction value f1 (Sus) to increase as said unsharp mask signal Sus decreases.

19. The dynamic range compression method of claim 18, wherein said determining step determines a compression rate.

20. The dynamic range compression method of claim 18, wherein said determining step determines a compression region.

21. The dynamic range compression method of claim 3, wherein the step of obtaining dynamic range information of said object comprises obtaining a histogram of said original image signal Sorg in a region of interest.

22. The dynamic range compression method of claim 21, wherein the step of obtaining dynamic range information of said object comprises obtaining a maximum value and a minimum value of said histogram.

23. The dynamic range compression method of claim 3, wherein the step of obtaining the dynamic range information comprises obtaining a profile information of said original image signal Sorg.

24. The dynamic range compression method of claim 23, wherein the step of obtaining the dynamic range information comprises obtaining a maximum value and a minimum value of said profile information.

25. The dynamic range compression method of claim 1, wherein said step of obtaining said information of said object comprises obtaining information of a radiographic region of said object.

26. The dynamic range compression method of claim 25, wherein said determining step determines said correction value f1 (Sus) to satisfy the following equations:

f1 (Sus)=$\beta$ (Sus1−Sus) when Sus<Sus1 f1 (Sus)=0 when Sus1≦Sus where $\beta$ represents a coefficient, and Sus1 represents a reference value.

27. The dynamic range compression method of claim 26, wherein said determining step determines at least one of said coefficient $\beta$ and said reference value Sus1.

28. The dynamic range compression method of claim 25, wherein said determining step determines said correction value f1 (Sus) to satisfy the following equations:

f1 (Sus)=$\beta$1 (Sus1−Sus) when Sus≦Sus1 f1 (Sus)=0 when Sus1<Sus≦Sus2; and f1 (Sus)=β2 (Sus2−Sus) when Sus2<Sus where β1 and β2 represent coefficients, and Sus1 and Sus2 represent reference values.

29. The dynamic range compression method of claim 28, wherein said determining step determines at least one said coefficients β1 and β2.

30. The dynamic range compression method of claim 28, wherein said determining step determines at least one of said reference values Sus1 and Sus2.

31. The dynamic range compression method of claim 25, wherein said determining step determines said correction value f1 (Sus) to satisfy the following equation:

f1 (Sus)=0 when Sus<Sus1 f1 (Sus)=β (Sus1−Sus)² when Sus1≦Sus where β represents a coefficient, and Sus1 represents a reference value.

32. The dynamic range compression method of claim 31, wherein said determining step determines at least one of said coefficient β and said reference value Sus1.

33. The dynamic range compression method of claim 25, wherein said determining step determines said correction value f1 (Sus) to satisfy the following equation:

f1 (Sus)=β (Sus1−Sus) when Sus1<Sus f1 (Sus)=0 when Sus≦Sus1 where β represents a coefficient, and Sus1 represents a reference value.

34. The dynamic range compression method of claim 33, wherein said determining step determines at least one of said coefficient β and said reference value Sus1.

35. The dynamic range compression method of claim 25, wherein said determining step determines said correction value f1 (Sus) to decrease monotonically.

36. The dynamic range compression method of claim 35, wherein said determining step determines a compression rate.

37. The dynamic range compression method of claim 35, wherein said determining step determines a compression region.

38. The dynamic range compression method of claim 25, wherein said determining step determines a reduction rate of said correction value f1 (Sus) to increase as said unsharp mask signal Sus increases.

39. The dynamic range compression method of claim 38, wherein said determining step determines a compression rate.

40. The dynamic range compression method of claim 36, wherein said determining step determines a compression region.

41. The dynamic range compression method of claim 25, wherein said determining step determines a reduction rate of said correction value f1 (Sus) to increase as said unsharp mask signal Sus decreases.

42. The dynamic range compression method of claim 41, wherein said determining step determines a compression rate.

43. The dynamic range compression method of claim 41, wherein said determining step determines a compression region.

44. A dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

obtaining an unsharp mask signal Sus corresponding to said original image signal Sorg in accordance with an absolute value of a signal difference between a central pixel and a peripheral pixel, both said central pixel and said peripheral pixel being positioned within a mask region;

obtaining a correction value f(Sus) which is a function that decreases as said unsharp mask signal Sus increases; and conducting an operation based on an equation Sproc=Sorg+f(Sus)

45. The dynamic range compression method of claim 44, further comprising the step of:

providing less weighting to said peripheral pixel as a signal difference value between said peripheral pixel and said central pixel becomes larger in said step of obtaining said unsharp mask signal Sus.

46. A dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

obtaining an unsharp mask signal Sus corresponding to said original image signal Sorg in accordance with a positional relation between a central pixel and a peripheral pixel, both said central pixel and said peripheral pixel being positioned within a mask region;

obtaining a correction value f(Sus) which is a function that decreases as said unsharp mask signal Sus increases; and conducting an operation based on an equation;

Sproc=Sorg+f(Sus)

47. The dynamic range compression method of claim 46, wherein the step of obtaining the unsharp image signal Sus comprises:

providing less weighting to said peripheral pixel as a distance between said peripheral pixel and said central pixel increases.

48. A dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

displaying said original image corresponding to said original image signal Sorg on a display device;

determining a compression rate and a compression region based on said original image;

determining a function based on said compression rate and said compression region based on an equation:

Dproc=Dorg+f(Dus)

wherein:

Dproc represents a density of the processed image signal

Dorg represents a density of said original image displayed on said display device; and f(Dus) is a correction value which is a function that decreases as Dus increases transforming said density of the processed image signal Dproc, said density of said original image Dorg, and said correction value f(Dus) by use of a gradation conversion table which was determined by said original image signal Sorg;

obtaining an unsharp mask signal Sus corresponding to said original image signal Sorg;

obtaining a function based on an equation;

Sproc=Sorg+f(Sus)

wherein f(Sus) is a correction value that decreases as said unsharp mask signal Sus increases; and f(Sus) is obtained by transforming said correction value f(Dus) based on said gradation conversion table; and performing a processing operation based on said equation.

49. A dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

obtaining an unsharp mask signal Sus corresponding to said original image signal Sorg;

obtaining a correction value f(Sus) which is a function that decreases as said unsharp mask signal Sus increases; and conducting an operation based on an equation:

Sproc=Sorg+f(Sus)

wherein:

said correction value f(Sus) has a positive maximum value at a point where said unsharp mask signal Sus has a predetermined value; and said correction value f(Sus) monotonically decreases as said unsharp mask signal Sus increases in a region where said unsharp mask signal Sus is greater than said predetermined value; and said correction value f(Sus) has a value that is monotonically decreasing as said unsharp mask signal Sus is one of decreasing and fixed to said positive maximum value in a region where said unsharp mask signal Sus is less than said predetermined value.

50. A dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

obtaining an unsharp mask signal Sus corresponding to said original image signal Sorg;

obtaining a correction value f(Sus) which is a function that decreases as said unsharp mask signal Sus increases; and conducting an operation based on an equation:

Sproc=Sorg+f(Sus)

wherein:

said correction value f(Sus) has a negative maximum value at a point where said unsharp mask signal Sus has a predetermined value;

said correction value f(Sus) monotonically decreases as said unsharp mask signal Sus increases in a region where said unsharp mask signal Sus is less than said predetermined value; and said correction value f(Sus) has a value that monotonically increases when said unsharp mask signal Sus is one of increasing and fixed to said negative maximum value in a region where said unsharp mask signal Sus is greater than said predetermined value.

51. A dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

obtaining an unsharp mask signal Sus corresponding to said original image signal Sorg;

obtaining a correction value f(Sus) which is a function that decreases as said unsharp mask signal Sus increases; and conducting an operation based on an equation:

Sproc–Sorg+f(Sus)

wherein:

said correction value f(Sus) has a positive maximum value at a point where said unsharp mask signal Sus has a first predetermined value and has a negative maximum value at a point where said unsharp mask signal Sus has a second predetermined value greater than said first predetermined value;

said correction value f(Sus) monotonically decreasing as said unsharp mask signal Sus increases in a region where said unsharp mask signal Sus is greater than said first predetermined value and is less than said second predetermined value; and wherein:

said correction value f(Sus) has a value that monotonically decreases as said unsharp mask signal Sus is one of decreasing and fixed to the position maximum value in a region where said unsharp mask signal Sus is less than said first predetermined value; and said correction value f(Sus) has a value that monotonically increases as said unsharp mask signal Sus is one of fixed to said negative maximum value and is increasing in a region where said unsharp mask signal Sus is greater than said second predetermined value.

52. The dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

selecting a region of said object to be processed;

determining a correction function F among a plurality of correction functions in accordance with said selected region to be processed; and conducting an operation based on an equation:

Sproc=Sorg+F

53. The dynamic range compression method of claim 52, wherein the step of selecting said region to be processed includes a step of dividing said region by at least one of contours of said object, contours of an internal structure in said object, and a boarder line of a non-irradiated region of said object.

54. The dynamic range compression method of claim 52, wherein the plurality of correction functions includes a correction function that is a function which decreases as said unsharp mask signal Sus, corresponding to said original image signal Sorg, increases and said plurality of correction functions further includes a function which is independent of said unsharp mask signal Sus.

55. A dynamic range compression method for a radiographic image, for obtaining a processed image signal Sproc having a dynamic range which is narrower than a dynamic range of an original image signal Sorg, the method comprising the steps of:

obtaining the original image signal Sorg representing the original image based on a radiation transmitted through an object;

obtaining an unsharp mask signal Sus corresponding to said original image signal Sorg by using a median value among a plurality of signal values in a mask region;

obtaining a correction value f(Sus) which is a function that decreasing as said unsharp mask signal Sus increases; and conducting an operation based on an equation:

Sproc=Sorg+f(Sus)

56. The dynamic range compression method of claim 55, wherein said step of obtaining the correction value f(Sus) comprises selecting said median value to be a central value among said plurality of signal values.

57. The dynamic range compression method of claim 55, wherein said unsharp mask signal Sus has a predetermined value, and said correction value f(Sus) has a value that monotonically decreases where said unsharp mask signal Sus increases in a region where said unsharp mask signal Sus is greater than said predetermined value.

58. The dynamic range compression method of claim 57, wherein said obtained correction value f1 (Sus) satisfies the following equation:

f(Sus)=β (Sus1−Sus) when Sus1<Sus f(Sus)=0 when Sus≦Sus1 where β represents a coefficient, and Sus1 represents a reference value.

59. A dynamic range compression method for a radiographic image, for obtaining a processed image signal Sproc having a dynamic range which is narrower than a dynamic range of an original image signal Sorg, the method comprising the steps of obtaining the original image signal Sorg representing the original image based on a radiation transmitted through an object;

detecting an information of said object;

obtaining an unsharp mask signal Sus corresponding to said original image signal Sorg, wherein at least one of a type of said unsharp mask signal Sus and a mask size of said unsharp mask signal Sus which are provided for obtaining said unsharp mask signal Sus, is determined in accordance with said information of said object;

obtaining a correction value f(Sus) which is a function that decreases as said unsharp mask signal Sus increases; and conducting an operation based on an equation:

Sproc=Sorg+f(Sus)

60. The dynamic range compression method of claim 59, wherein said step of obtaining an information of said object includes obtaining information at least one of an information of a frequency component of a signal for said object and obtaining an information of a radiographing region of said object.

61. The dynamic range compression method of claim 60, wherein said step of obtaining information of said object includes a step of obtaining an information of a frequency component in each of a plurality of regions within said original image, and obtaining information of at least one of said type of said unsharp mask signal Sus and said mask size in each of said plurality of regions.

* * * * *